United States Patent
Turner

(10) Patent No.: US 11,384,696 B2
(45) Date of Patent: Jul. 12, 2022

(54) REDUCING LOW FLIGHT MACH NUMBER FUEL CONSUMPTION

(71) Applicant: ROLLS-ROYCE plc, London (GB)

(72) Inventor: Caroline L Turner, Derby (GB)

(73) Assignee: ROLLS-ROYCE plc, London (GB)

( * ) Notice: Subject to any disclaimer, the term of this patent is extended or adjusted under 35 U.S.C. 154(b) by 280 days.

(21) Appl. No.: 16/892,589

(22) Filed: Jun. 4, 2020

(65) Prior Publication Data
US 2021/0033031 A1     Feb. 4, 2021

(30) Foreign Application Priority Data
Jun. 12, 2019 (GB) .................................. 1908373

(51) Int. Cl.
*F02C 9/44* (2006.01)
*F01D 15/10* (2006.01)
*F02C 7/32* (2006.01)

(52) U.S. Cl.
CPC ................ *F02C 9/44* (2013.01); *F01D 15/10* (2013.01); *F02C 7/32* (2013.01); *F05D 2220/323* (2013.01); *F05D 2220/76* (2013.01); *F05D 2270/051* (2013.01); *F05D 2270/07* (2013.01); *F05D 2270/122* (2013.01)

(58) Field of Classification Search
CPC ...... F02C 7/32; F02C 9/28; F02C 9/44; F02C 9/48; F01D 15/10; H02K 7/1823; F05D 2220/76; F05D 2270/122
See application file for complete search history.

(56) References Cited

U.S. PATENT DOCUMENTS

| 7,926,287 | B2 | 4/2011 | Ullyott et al. |
| 8,561,413 | B2 | 10/2013 | Taneja |
| 9,045,996 | B2 | 6/2015 | Anghel et al. |
| 9,260,195 | B2 * | 2/2016 | Oyori .................. F02C 7/36 |
| 9,266,716 | B2 | 2/2016 | Feyh et al. |

(Continued)

FOREIGN PATENT DOCUMENTS

| EP | 1947311 A2 | 7/2008 |
| EP | 1990519 A2 | 11/2008 |

(Continued)

OTHER PUBLICATIONS

Nov. 11, 2020 Search Report issued in European Patent Application No. 20176765.4.

(Continued)

*Primary Examiner* — Alain Chau
(74) *Attorney, Agent, or Firm* — Oliff PLC

(57) ABSTRACT

A gas turbine engine for an aircraft, comprises a high-pressure (HP) spool comprising an HP compressor and a first electric machine driven by an HP turbine, the first electric machine having a first maximum output power; a low-pressure (LP) spool comprising an LP compressor and a second electric machine driven by an LP turbine, the second electric machine having a second maximum output power; and an engine controller configured to identify a condition to the effect that the LP turbine is operating in an unchoked regime, and, in response to an electrical power demand being between zero and the first maximum output power, only extracting electrical power from the first electric machine to meet the electrical power demand.

4 Claims, 22 Drawing Sheets

(56) References Cited

U.S. PATENT DOCUMENTS

| | | | |
|---|---|---|---|
| 9,601,970 B2 | 3/2017 | French et al. | |
| 9,853,581 B2 * | 12/2017 | Armstrong | F01D 21/14 |
| 10,284,125 B2 * | 5/2019 | Armstrong | H02P 9/04 |
| 10,429,154 B2 * | 10/2019 | Munevar | F02C 7/275 |
| 10,436,122 B2 | 10/2019 | Cline et al. | |
| 10,480,408 B2 * | 11/2019 | Munevar | F02C 9/28 |
| 10,583,931 B2 * | 3/2020 | Cline | F02C 9/00 |
| 10,644,630 B2 | 5/2020 | Smith et al. | |
| 11,139,716 B2 * | 10/2021 | Husband | F02K 3/06 |
| 2006/0042252 A1 * | 3/2006 | Derouineau | F02C 9/26 60/703 |
| 2006/0150633 A1 | 7/2006 | Mcginley et al. | |
| 2008/0238202 A1 | 10/2008 | Kern et al. | |
| 2008/0276620 A1 | 11/2008 | Ullyott et al. | |
| 2009/0169362 A1 | 7/2009 | Wadia et al. | |
| 2010/0251726 A1 | 10/2010 | Jones et al. | |
| 2012/0167576 A1 | 7/2012 | Taneja | |
| 2014/0245748 A1 | 9/2014 | Anghel et al. | |
| 2014/0271114 A1 * | 9/2014 | Phillips | G05B 23/0294 415/118 |
| 2014/0360205 A1 | 12/2014 | French et al. | |
| 2015/0100180 A1 * | 4/2015 | Oyori | B60R 16/03 701/3 |
| 2015/0191252 A1 * | 7/2015 | Cline | F02C 6/14 60/39.24 |
| 2015/0244296 A1 | 8/2015 | Edwards | |
| 2015/0274506 A1 | 10/2015 | Feyh et al. | |
| 2016/0010567 A1 | 1/2016 | Cline et al. | |
| 2017/0044989 A1 | 2/2017 | Gemin et al. | |
| 2017/0187311 A1 | 6/2017 | French et al. | |
| 2017/0226934 A1 | 8/2017 | Robic et al. | |
| 2017/0324360 A1 * | 11/2017 | Cline | B64D 27/24 |
| 2017/0334377 A1 | 11/2017 | Klemen et al. | |
| 2017/0335710 A1 | 11/2017 | Klemen et al. | |
| 2017/0335713 A1 | 11/2017 | Klemen et al. | |
| 2017/0335795 A1 | 11/2017 | Klemen et al. | |
| 2018/0058330 A1 | 3/2018 | Munevar | |
| 2018/0058336 A1 * | 3/2018 | Munevar | F01D 19/00 |
| 2018/0087396 A1 | 3/2018 | Van Der Merwe et al. | |
| 2018/0252161 A1 * | 9/2018 | Munevar | F02C 6/14 |
| 2018/0354631 A1 | 12/2018 | Adibhatla et al. | |
| 2019/0165708 A1 | 5/2019 | Smith et al. | |
| 2020/0052552 A1 * | 2/2020 | Husband | F02C 3/10 |

FOREIGN PATENT DOCUMENTS

| | | |
|---|---|---|
| EP | 2472084 A2 | 7/2012 |
| EP | 2733312 A2 | 5/2014 |
| EP | 2889452 A1 | 7/2015 |
| EP | 2930335 A1 | 10/2015 |
| EP | 3246528 A1 | 11/2017 |
| EP | 3290680 A1 | 3/2018 |
| EP | 3412575 A1 | 12/2018 |
| EP | 3489468 A1 | 5/2019 |
| GB | 2444838 A | 6/2008 |
| WO | 2014/143218 A1 | 9/2014 |

OTHER PUBLICATIONS

Combined Search and Examination Report of the Intellectual Property Office of the United Kingdom for GB1908368.2 with report date of Nov. 25, 2019 and search date of Nov. 20, 2019.

Combined Search and Examination Report of the Intellectual Property Office of the United Kingdom for GB1908369.0 with report date of Nov. 25, 2019 and search date of Nov. 24, 2019.

Combined Search and Examination Report of the Intellectual Property Office of the United Kingdom for GB1908370.8 with report date of Nov. 25, 2019 and search date of Nov. 24, 2019.

Combined Search and Examination Report of the Intellectual Property Office of the United Kingdom for GB1908371.6 with report date of Nov. 25, 2019 and search date of Nov. 24, 2019.

Search Report of the Intellectual Property Office of the United Kingdom for GB1908372.4 with search date of Nov. 22, 2019.

Search Report of the Intellectual Property Office of the United Kingdom for GB1908373.2 with search date of Nov. 25, 2019.

Combined Search and Examination Report of the Intellectual Property Office of the United Kingdom for GB1908374.0 with report date of Nov. 26, 2019 and search date of Nov. 25, 2019.

Combined Search and Examination Report of the Intellectual Property Office of the United Kingdom for GB1908375.7 with report date of Nov. 26, 2019 and search date of Nov. 25, 2019.

Combined Search and Examination Report of the Intellectual Property Office of the United Kingdom for GB1908376.5 with report date of Nov. 26, 2019 and search date of Nov. 25, 2019.

Combined Search and Examination Report of the Intellectual Property Office of the United Kingdom for GB1908377.3 with report date of Nov. 25, 2019 and search date of Nov. 21, 2019.

* cited by examiner

REDUCING LOW FLIGHT MACH NUMBER FUEL CONSUMPTION

CROSS-REFERENCE TO RELATED APPLICATIONS

This specification is based upon and claims the benefit of priority from UK Patent Application Number 1908373.2 filed on 12 Jun. 2019, the entire contents of which are incorporated herein by reference.

TECHNICAL FIELD

This disclosure relates to gas turbine engines.

BACKGROUND

Gas turbine engines featuring electric machines operable as both motors and generators are known, such as those used for more electric aircraft. Whilst such engines may include a plurality of such electric machines for redundancy, they are only coupled to one of the spools. For example, one known configuration includes such electric machines coupled to the high-pressure spool of a twin-spool turbofan. Another includes such electric machines coupled to the intermediate-pressure spool of a triple-spool turbofan.

An issue with such a configuration is that for a given electrical power demand, there is no choice but to supply it from the single spool in the engine. Thus the design of the turbomachinery must be capable of accommodating all possible electrical power demands throughout the operational envelope, which inevitably leads to compromise.

It has therefore been proposed to include an electric machine on two or more shafts of a multi-spool engine. Whilst numerous documents put forward candidates for the optimal physical implementations of such an architecture, few make reference to the optimal control strategy to operate such configurations.

SUMMARY

In an aspect, there is provided a gas turbine engine for an aircraft, comprising:

a high-pressure (HP) spool comprising an HP compressor and a first electric machine driven by an HP turbine, the first electric machine having a first maximum output power;

a low-pressure (LP) spool comprising an LP compressor and a second electric machine driven by an LP turbine, the second electric machine having a second maximum output power; and an engine controller configured to identify a condition to the effect that the LP turbine is operating in an unchoked regime, and, in response to an electrical power demand being between zero and the first maximum output power, only extracting electrical power from the first electric machine to meet the electrical power demand.

In another aspect, there is provided a method of reducing fuel consumption at low inlet Mach numbers in a gas turbine engine of the type having a high-pressure (HP) spool comprising an HP compressor and a first electric machine driven by an HP turbine, the first electric machine having a first maximum output power, and a low-pressure (LP) spool comprising an LP compressor and a second electric machine driven by an LP turbine, the second electric machine having a second maximum output power, the method comprising:

identifying a condition to the effect that the LP turbine is operating in an unchoked regime; and in response to an electrical power demand being between zero and the first maximum output power, only extracting electrical power from the first electric machine to meet the electrical power demand

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
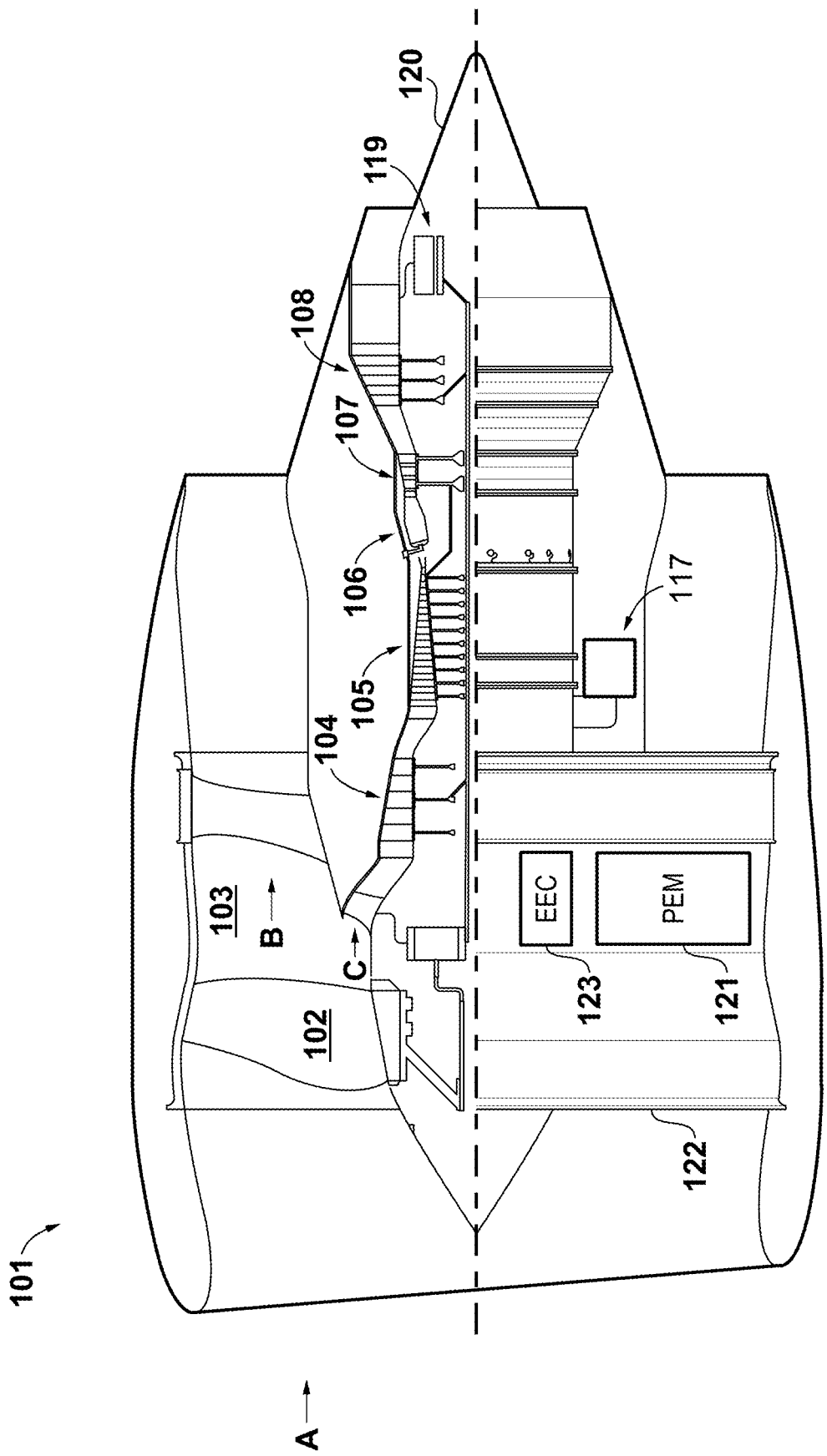
FIG. 1 shows a general arrangement of an engine for an aircraft.
Figure 2:
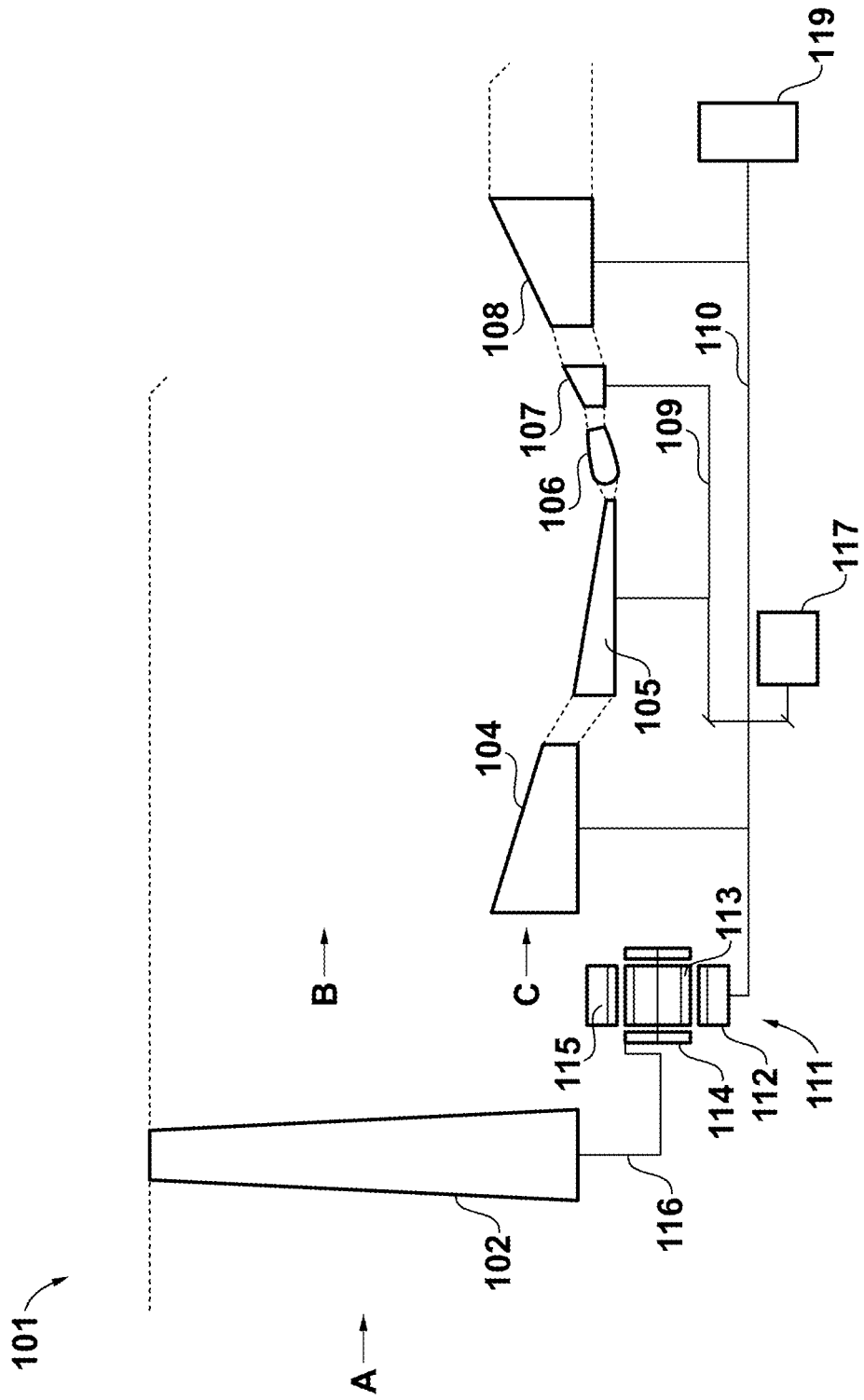
FIG. 2 is a block diagram of the engine of FIG. 1.

The present invention is described in the context of two-spool, geared turbofan engine architectures. However, it will be apparent to those skilled in the art that the principles of the present invention may be applied to other engine types including gas turbines with two or more spools, such as direct-drive turbofans, turboprops, or open rotor engines.
FIGS. 1 & 2

A general arrangement of an engine 101 for an aircraft is shown in FIG. 1, with an equivalent block diagram of the main components thereof being presented in FIG. 2.

In the present embodiment, the engine 101 is a turbofan, and thus comprises a ducted fan 102 that receives intake air A and generates two airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In use, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft 109. The low-pressure turbine 108 drives the low-pressure compressor 104 via an interconnecting shaft 110. Together, the high-pressure compressor 105, interconnecting shaft 109 and high-pressure turbine 107 form part of a high-pressure spool of the engine 101. Similarly, the low-pressure compressor 104, interconnecting shaft 110 and low-pressure turbine 108 form part of a low-pressure spool of the engine 101.

The fan 102 is driven by the low-pressure turbine 101 via a reduction gearbox in the form of a planetary-configuration epicyclic gearbox 111. Thus in addition to the low-pressure compressor 104, the interconnecting shaft 110 is also connected with a sun gear 112 of the gearbox 111. The sun gear 112 is meshed with a plurality of planet gears 113 located in a rotating carrier 114, which planet gears 113 are in turn are meshed with a static ring gear 115. The rotating carrier 114 is connected with the fan 102 via a fan shaft 116.

It will be appreciated however that a different number of planet gears may be provided, for example three planet gears, or six, or any other suitable number. Further, it will be appreciated that in alternative embodiments a star-configuration epicyclic gearbox may be used instead.

In order to facilitate electrical generation by the engine 101, a first electric machine 117 capable of operating both as a motor and generator (hereinafter, "HP motor-generator") forms part of the high-pressure spool and is thus connected with the interconnecting shaft 109 to receive drive therefrom. In the present embodiment, this is implemented using a tower-shaft arrangement of the known type. In alternative embodiments, the HP motor-generator 117 may be mounted coaxially with the turbomachinery in the engine 101. For example, the HP motor-generator 117 may be mounted axially in line with the duct 118 between the low- and high-pressure compressors.

Similarly, a second electric machine 119 capable of operating both as a motor and generator (hereinafter, "LP motor-generator") forms part of the low-pressure spool and is thus connected with the interconnecting shaft 110 to receive drive therefrom. In the present embodiment, the LP motor-generator 119 is mounted in the tailcone 120 of the engine 101 coaxially with the turbomachinery. In alternative embodiments, the LP motor-generator 119 may be located axially in line with low-pressure compressor 104, which may adopt a bladed disc or drum configuration to provide space for the LP motor-generator 119.

It will of course be appreciated by those skilled in the art that any suitable location for the HP and LP motor-generators may be adopted.

In the present embodiment, the HP and LP motor-generators are permanent-magnet type motor-generators. Thus, the rotors of the machines comprise permanent-magnets for generation of magnetic fields for interaction with the stator windings. Extraction of power from, or application of power to the windings is performed by a power electronics module (PEM) 121. In the present embodiment, the PEM 121 is mounted on the fancase 122 of the engine 101, but it will be appreciated that it may be mounted elsewhere such as on the core gas turbine, or in the vehicle to which the engine 101 is attached, for example.

Control of the PEM 121 and of the HP and LP motor-generator is in the present example performed by an electronic engine controller (EEC) 123. In the present embodiment the EEC 123 is a full-authority digital engine controller (FADEC), the configuration of which will be known and understood by those skilled in the art. It therefore controls all aspects of the engine 101, i.e. both of the core gas turbine and the motor-generators 117 and 119. In this way, the EEC 123 may holistically respond to both thrust demand and electrical power demand.

An embodiment of the overall system will be described with reference to FIG. 3, and the control software architecture will be described with reference to FIGS. 4 and 5. The various control strategies implemented in response to various engine operational phenomena will be described with reference to FIGS. 6 to 22.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). In addition to, or in place of, axial stages, the low-or high-pressure compressors 104 and 105 may comprise centrifugal compression stages.

The low- and high-pressure turbines 107 and 108 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres (around 100 inches), 2.6 metres, 2.7 metres (around 105 inches), 2.8 metres (around 110 inches), 2.9 metres (around 115 inches), 3 metres (around 120 inches), 3.1 metres (around 122 inches), 3.2 metres (around 125 inches), 3.3 metres (around 130 inches), 340 cm (around 135 inches), 3.5 metres (around 138 inches), 3.6 metres (around 140 inches), 3.7 metres (around 145 inches), 3.8 metres (around 150 inches) or 3.9 metres (around 155 inches). The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine 103. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$, or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvinor 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvinor 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the art as the "economic mission") may mean cruise conditions of an aircraft to which the gas turbine engine is designed to be attached. In this regard, mid-cruise is the point in an aircraft flight cycle at which 50 percent of the total fuel that is burned between top of climb and start of descent has been burned (which may be approximated by the midpoint—Such cruise conditions may be conventionally defined as the conditions at mid-cruise, for example the conditions experienced by the aircraft and/or engine at the midpoint (in terms of time and/or distance-) between top of climb and start of descent. Cruise conditions thus define an operating point of, the gas turbine engine that provides a thrust that would ensure steady state operation (i.e. maintaining a constant altitude and constant Mach number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

FIG. 3

Figure 3:
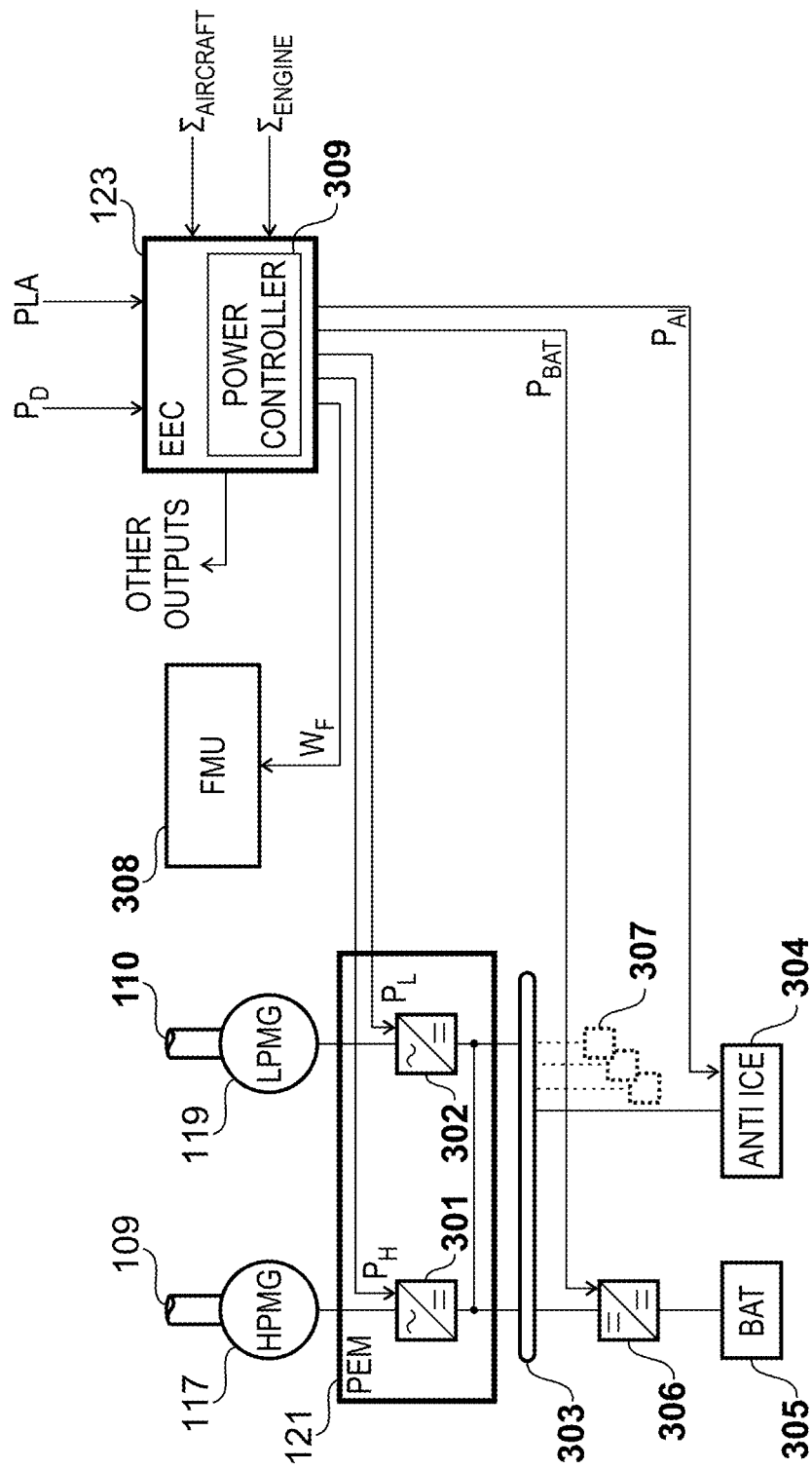
FIG. 3 is a block diagram of the interface of the electronic engine controller and other systems on the engine of FIG. 1.
Figure 4:
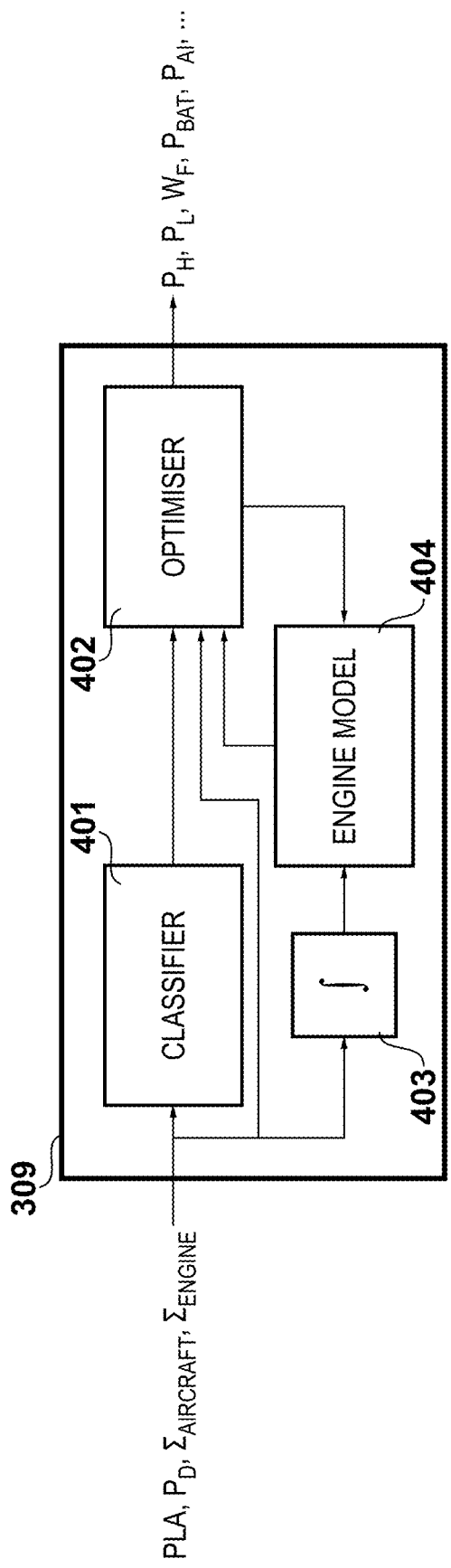
FIG. 4 is block diagram of the functional modules of the power controller in the electronic engine controller of FIG. 3.

A block diagram of the interface of the EEC 123 and other engine systems is shown in FIG. 3.

As described previously, in the present embodiment, the EEC 123 is coupled with the PEM 121 to control the HP motor-generator 117 and the LP motor-generator 119. In this way, power may either be extracted from or added to each of shafts 109 and 110.

In the present embodiment, the PEM 121 facilitates conversion of alternating current to and from direct current. This is achieved in the present embodiment by employing a respective bidirectional power converter for conversion of ac to and from dc. Thus, as shown in the Figure, the PEM 121 comprises a first bidirectional power converter 301 connected with the HP motor-generator 117, and a second bidirectional power converter 302 connected with the LP motor-generator 119. The dc sides of the power converters 301 and 302 are in the present example connected with each other to facilitate bidirectional power transfer between the motor-generators 117 and 119.

In an embodiment, both motor-generators and associated bidirectional power converters are rated at the same continuous power. In a specific embodiment, they are rated at from 250 kilowatts to 2 megawatts. In a more specific embodiment, they are rated from 300 kilowatts to 1 megawatt. In a more specific embodiment, they are rated at 350 kilowatts.

In other embodiments, the HP motor-generator 117 and the first bidirectional power converter 301 are rated at a different continuous power than the LP motor-generator 119 and the second bidirectional power converter 302. In a specific embodiment, they are rated at from 250 kilowatts to 2 megawatts. In a more specific embodiment, they are rated from 350 kilowatts to 1 megawatt. In a more specific embodiment, they are rated at 350 kilowatts.

Those skilled in the art will be familiar with the term "continuous power," i.e. a maximum sustainable power output that does not damage components due to over-current, over-voltage, or over-temperature for example.

In the present example, the dc sides of the power converters 301 and 302 are also connected with a dc bus 303.

In the present example the dc bus 303 has connected to it various loads, which may be either located on the engine 101 or on the vehicle instead. Some such as anti-icing systems 304 may be part of the engine, such as electric nacelle anti-icing systems, or part of the aircraft on which the engine 101 is installed, such as electric wing anti-icing systems.

Other loads may be connected with the dc bus 303 and be able to draw power from and supply power to the bus, such as an energy storage device in the form of a battery 305. In the present example, control of the charge/discharge state of the battery 305 is facilitated by a dc-dc converter 306. Other energy storage devices may be connected to the dc bus 303 as well as or in place of the battery 305, such as a capacitor.

Other loads, indicated at 307, may be connected with the dc bus 303 such as cabin environmental control systems, electric actuation systems, auxiliary power units, etc.

In operation, the EEC 123 receives a plurality of demand signals, namely a thrust demand in the form of a power lever angle (PLA) signal which may be manually set or by an autothrottle system, and an electrical power demand ($P_D$). In addition, the EEC receives a plurality of sets of measured parameters, namely a set concerning flight parameters of the vehicle, $\Sigma_{AIRCRAFT}$, and a set concerning operational parameters of the engine, $\Sigma_{ENGINE}$. As will be described further with reference to FIGS. 4 and 5, these demands and parameters facilitate the derivation of a set of output parameters to control the core gas turbine and the motor-generators.

Thus in addition to the routine set of output parameters generated by a FADEC, such as the fuel flow $W_F$ to be metered by a fuel metering unit 308 on the engine 101, or variable-stator vane angle, handling bleed settings, etc. in the present embodiment the EEC 123 comprises a power controller module 309 to generate a control signal $P_H$ for the first bidirectional power converter 301 and a second control signal $P_L$ for the second bidirectional power converter 302. The control signals $P_H$ and $P_L$ control the operation of the power converters in terms of both direction and magnitude of electrical power. In this way, the EEC 123 may meet the demanded power $P_D$ using a suitable balance of electrical power from the HP and LP motor-generators. As will be described with reference to the later Figures, the optimum way to do this varies throughout a mission.

In addition to the control signals $P_H$ and $P_L$, in the present example the power controller 309 is configured to derive a control signal $P_{BAT}$ for the dc-dc converter 306 to facilitate charge or discharge of the battery 305.

Figure 8:
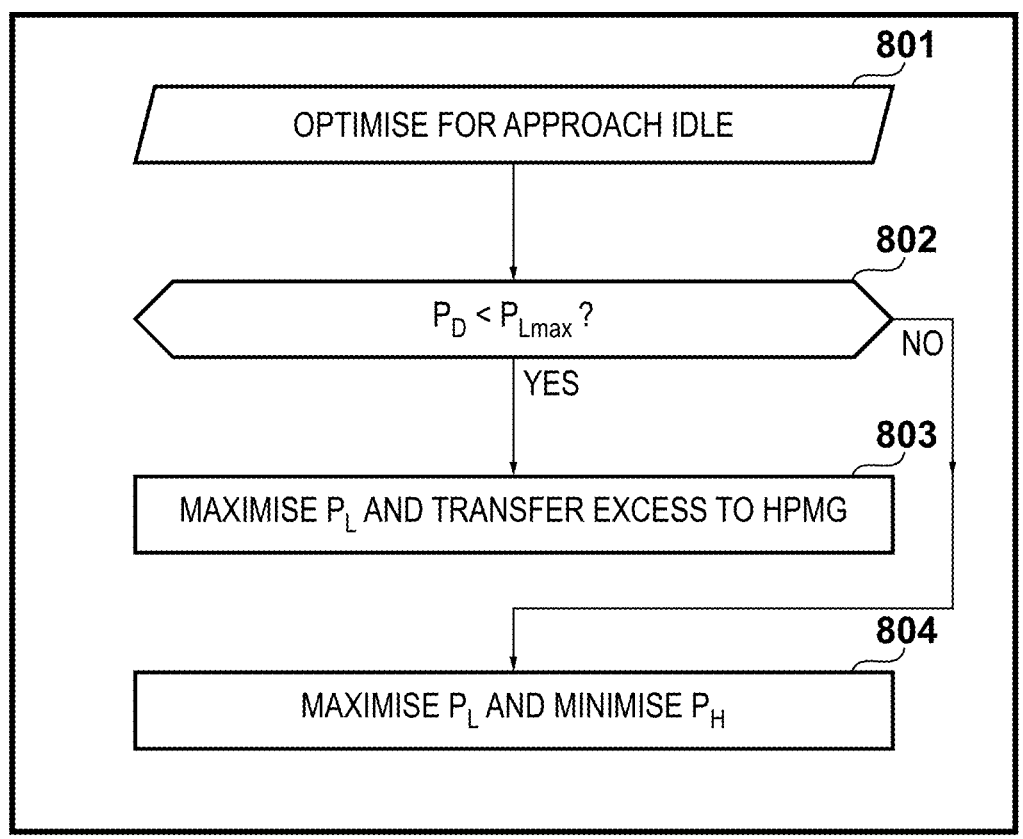
FIG. 8 shows a procedure to optimise operation of the engine of FIG. 1 during an approach idle condition.

In a specific embodiment, the power controller 309 is configured to, in normal operation, set $P_{BAT}$ to zero, and only change its status as set out in the optimisation routines described herein, for example the routines described with reference to FIGS. 8 and 12.

In another specific embodiment, the power controller 309 includes battery optimisation functionality and modifies the power demand parameter $P_D$ by adding or subtracting a value $P_{BAT}$ depending upon whether it is more optimal to charge, discharge, or maintain the charge of the battery 305. Those skilled in the art will be familiar with such types of battery state-of-charge optimisation routines.

Thus, in such an embodiment, the power controller 309 modifies the power demand parameter $P_D$ by performing an addition-assignment operation $P_D\mathrel{+}=P_{BAT}$. The sign convention used herein is such that a positive $P_{BAT}$ means that the battery 305 is to be charged, and thus additional generation is required from the HP and LP motor-generators, whilst a negative $P_{BAT}$ means that the battery 305 is to be discharged.

It will be appreciated that in embodiments lacking an energy storage device, this signal will not be generated and thus the power demand parameter $P_D$ will not be modified at all.

In the present example another control signal $P_{AI}$ is generated to activate the anti-icing systems 304. In the present example only the nacelle anti-ice system of the engine 101 is controlled, however it is envisaged that the EEC 123 may in alternative implementations have authority over wing anti-ice in certain circumstances. In a similar way to the modification of $P_D$ by the addition-assignment of $P_{BAT}$, the power controller 309 is configured to perform the addition assignment $P_D\mathrel{+}=P_{AI}$ so as to account for the power required for the anti-icing systems 304. Again, it will be appreciated that in embodiments lacking electric anti-ice systems, this signal will not be generated and no modification of $P_D$ will be performed in this manner.

FIG. 4

In practice, the EEC 123 houses microprocessors for executing program modules to control the engine 101. A block diagram of the functional modules of the power controller 309 is shown in FIG. 4.

Input parameters previously described with reference to FIG. 3 are initially received by a classifier module 401 to output an optimiser setting mode for an optimiser module 402. The operation of the classifier module 401 will be described further with reference to FIG. 5, and the various modes of the optimiser module will be described with reference to FIGS. 7 to 22.

The input parameters are also supplied to a filter 403 prior to updating an engine model module 404. The filter 403 in the present example is an integrator to smooth out short-term transients so as to not cause large variations in the engine model. The engine model module 404 runs a real time model of the engine 101 so as to facilitate prediction of changes is operational parameters, such as $W_F$, $P_H$, and $P_L$ given a thrust demand. Such models and their integration within an EEC will be familiar to those skilled in the art.

Following entry into a given optimisation setting, the optimiser module 402 finds the optimal set of parameters for operation of the engine 101 given the current operational state of aircraft on which the engine is installed and the engine itself.

FIG. 5

Figure 5:
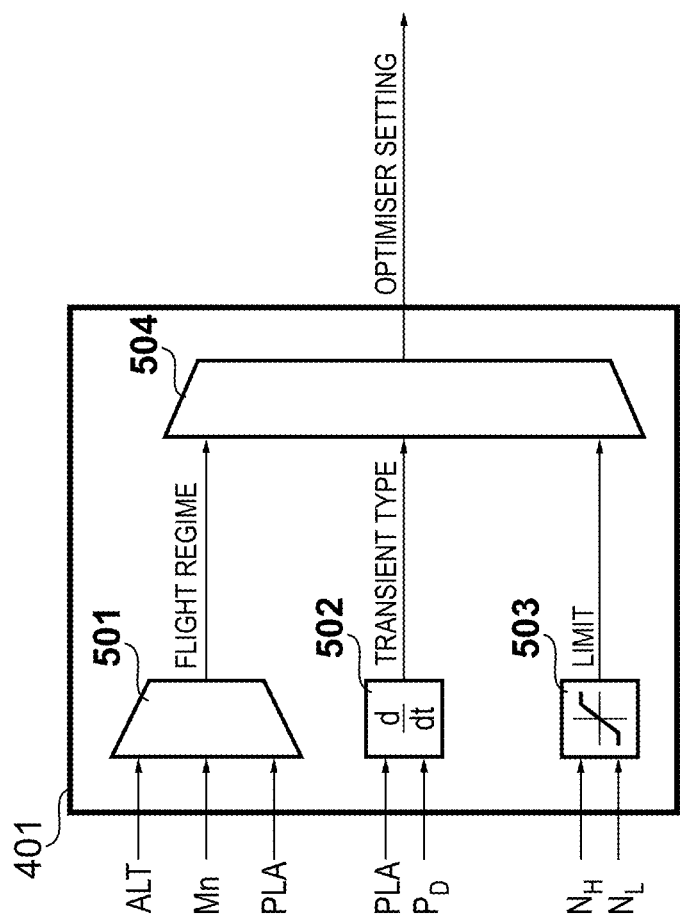
FIG. 5 is block diagram of the functional modules of the classifier in the power controller of FIG. 4.

The classifier module 401 is detailed in FIG. 5.

In the present embodiment, the classifier module 401 comprises a comparator 501 which compares the present altitude (ALT), the Mach number (Mn) and the power lever angle to determine the flight regime. It will be appreciated that other inputs may be utilised to increase the fidelity of the comparison process, such as engine conditions, ambient temperature, etc.

In the present embodiment, the comparator is configured to identify if the engine is operating in a maximum take-off condition if the altitude is less than a threshold, the Mach number is less than a threshold, and the power lever angle is at a maximum. In an embodiment, the altitude threshold is 5000 feet, whilst the Mach number threshold is 0.3.

In the present embodiment, the comparator is configured to identify if the engine is operating in a maximum climb condition if the altitude is above a threshold, and the power lever angle is at a maximum. In an embodiment, the altitude threshold is 30000 feet.

The optimisation strategy for the maximum take-off condition and the maximum climb mode of operation will be described further with reference to FIG. 6.

In the present embodiment, the comparator is configured to identify if the engine is operating in a cruise if the altitude is above a threshold, the Mach number is in a cruise range, and the power lever angle is at a cruise setting. In an embodiment, the altitude threshold is 30000 feet, whilst the Mach number range is from 0.8 to 0.9.

In such circumstances, the optimisation strategy that can be employed is to minimise fuel flow $W_F$ at constant thrust. Alternatively, the optimiser may be set to optimise surge margin in the engine, or to optimise compression efficiency depending on the engine and aircraft parameters. Such strategies will be described further with reference to FIGS. 19 and 21, respectively.

Alternatively, the optimiser may be set to optimise the bypass ratio by varying the core flow, implementing a variable cycle.

In the present embodiment, the comparator is configured to identify if the engine is operating in a regime in which the low-pressure turbine 108 is operating in an unchoked condition. This typically manifests at low Mach number idle conditions, although the unchoked condition may exist at other operating points depending upon the specific design of the low-pressure turbine 108 and the rest of the engine 101. In the present embodiment, the comparator is configured to identify this condition if the Mach number is below a threshold, and the power lever angle is at an idle setting. In an embodiment, the Mach number threshold is 0.2. In other embodiments, other inputs such as the corrected speed of the low pressure spool may be utilised to identify the unchoked condition.

Figure 7:
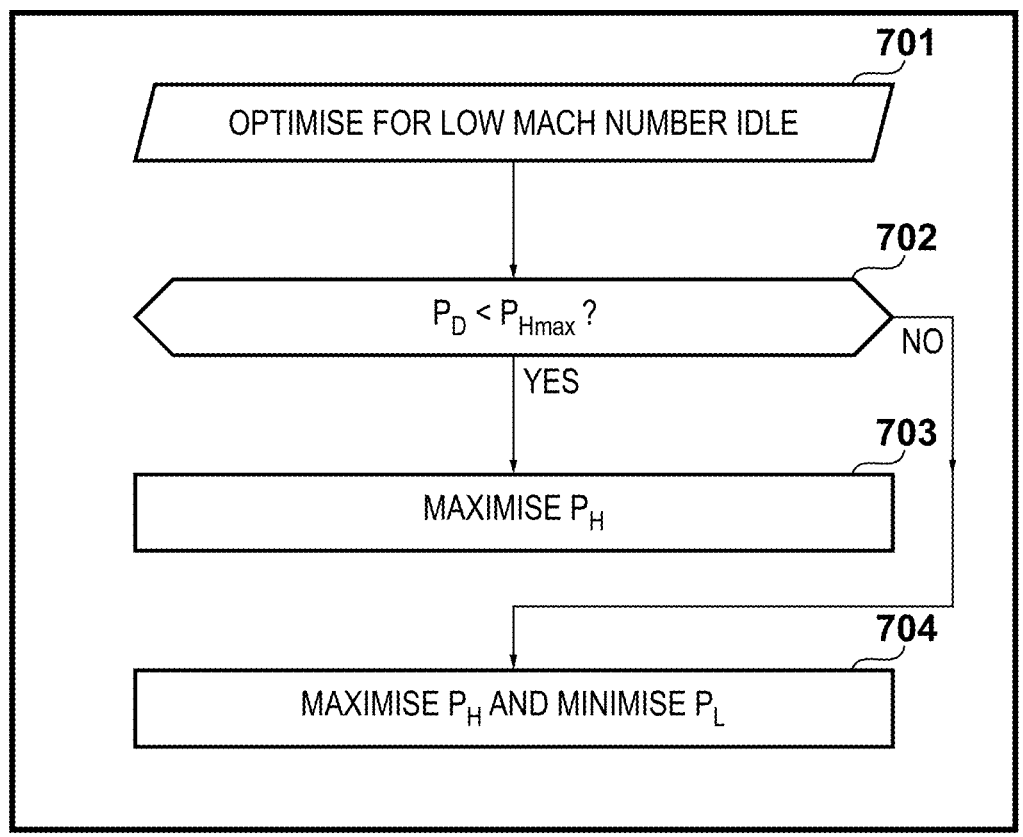
FIG. 7 shows a procedure to optimise operation of the engine of FIG. 1 in conditions in which the low pressure turbine is unchoked.

The optimisation strategy for the low Mach number idle condition will be described further with reference to FIG. 7.

In the present embodiment, the comparator is configured to identify if the engine is operating in an approach Mach number idle condition if the altitude is within a range, the Mach number is in a range, and the power lever angle is at an idle setting. In an embodiment, the altitude range is from 0 to 5000 feet above ground level, and the Mach number range is from 0.2 to 0.3.

The optimisation strategy for the approach idle condition will be described further with reference to FIG. 8.

The classifier module 401 further comprises a differentiator 502 which is configured to monitor the PLA and $P_D$ parameters and identify a transient type.

In response to the change in power lever angle being positive, the differentiator 502 is configured to identify the initiation of an acceleration event. The optimisation strategy for this manoeuvre will be described further with reference to FIG. 12.

In response to the change in power lever angle being negative, the differentiator 502 is configured to identify the initiation of a deceleration event. The optimisation strategy for this manoeuvre will be described further with reference to FIG. 14.

In response to a change in electrical power demand $P_D$, the differentiator 502 is configured to cause the optimiser to invoke the optimisation strategy described with reference to FIG. 17.

The classifier module 401 further comprises a limiter 503 which is configured to monitor the high-pressure and low-pressure spool speeds, $N_H$ and $N_L$. Should either spool speed approach a limit, which may be a maximum limit or a keep-out zone, the optimisation strategy described with reference to FIG. 22 may be invoked.

In the present example, the outputs of the comparator 501, differentiator 502 and limiter 503 are compared by a prioritiser 504. It will be appreciated that there may be concurrent outputs from each initial stage of the comparator module, and thus in the present embodiment the comparator is configured to filter to only one output optimiser setting. In the present embodiment, outputs from the limiter 503 are priorities over outputs from the differentiator 502, which are in turn prioritised over outputs from the comparator 501.

FIG. 6

Following the identification of a maximum take-off or maximum climb condition by the classifier module 401, the optimiser 402 enters the corresponding optimisation routine at step 601. At step 602, a question is asked as to whether the power demand $P_D$ is less than the maximum power rating of the LP motor-generator 119, $P_{Lmax}$. If so, then control proceeds to step 603 where the optimiser 402 maximises the power generation by the LP motor-generator 119, $P_L$.

Preferring electrical offtake from the low-pressure spool at temperature-limited conditions such as maximum take-off and maximum climb conditions reduces the load on the high-pressure spool. For a given power demand $P_D$, this results in a higher high-pressure spool rotational speed $N_H$. This increases the core flow C through the core gas turbine, and so reduces the stator outlet temperature required to deliver the low-pressure turbine power for a given thrust.

It has been found that for motor-generators rated at 350 kilowatts, it is possible to reduce the stator outlet temperature by 2 kelvin. It will be appreciated that the higher the rating of the motor-generators, the greater the reduction that may be achieved.

Clearly, if the power demand $P_D$ after accounting for battery charge/discharge and/or anti-icing system operation is greater than the maximum power rating of the LP motor-generator 119, $P_{Lmax}$, then the question asked at step 602 will be answered in the negative. In this case, control proceeds to step 604 where the optimiser 402 maximises the power generation by the LP motor-generator 119, $P_L$, and minimises the power generation by the HP motor-generator 117, $P_H$. Thus, the LP motor-generator 119 is directed to generate $P_{Lmax}$ and the HP motor-generator 117 is directed to generate the remainder, $P_D$-$P_{Lmax}$.

In an embodiment, should spare capacity be available from the LP motor-generator 119, then the optimiser 402 may elect to divert $P_{Lmax}$-$P_D$ to the HP motor-generator 117 which may further increase core flow and reduce stator outlet temperature.

FIG. 7

Following the identification of an unchoked regime for the low-pressure turbine 108 by the classifier module 401, the optimiser 402 enters the corresponding optimisation routine at step 701. As described previously, this may be triggered by a low Mach number idle operating condition, for example the ground idle operating point.

At step 702, a question is asked as to whether the power demand $P_D$ is less than the maximum power rating of the HP motor-generator 117, $P_{Hmax}$. If so, then control proceeds to step 703 where the optimiser 402 maximises the power generation by the HP motor-generator 119, $P_H$.

As the low-pressure turbine 108 is unchoked, there is a large impact when it is required to provide electrical power via the LP motor-generator 119. The reduction in the speed of the low-pressure spool, $N_L$, is such that there is a steep drop in the efficiency of the low-pressure compressor 104, and thus an increase in fuel burn. In practice, there may also be a drop in efficiency of the LP motor-generator 119 due to the lower rotational speed. Thus, at the low flight Mach numbers that cause the low-pressure turbine 108 to unchoke, it is possible to improve fuel consumption by this optimisation routine.

Figure 6:
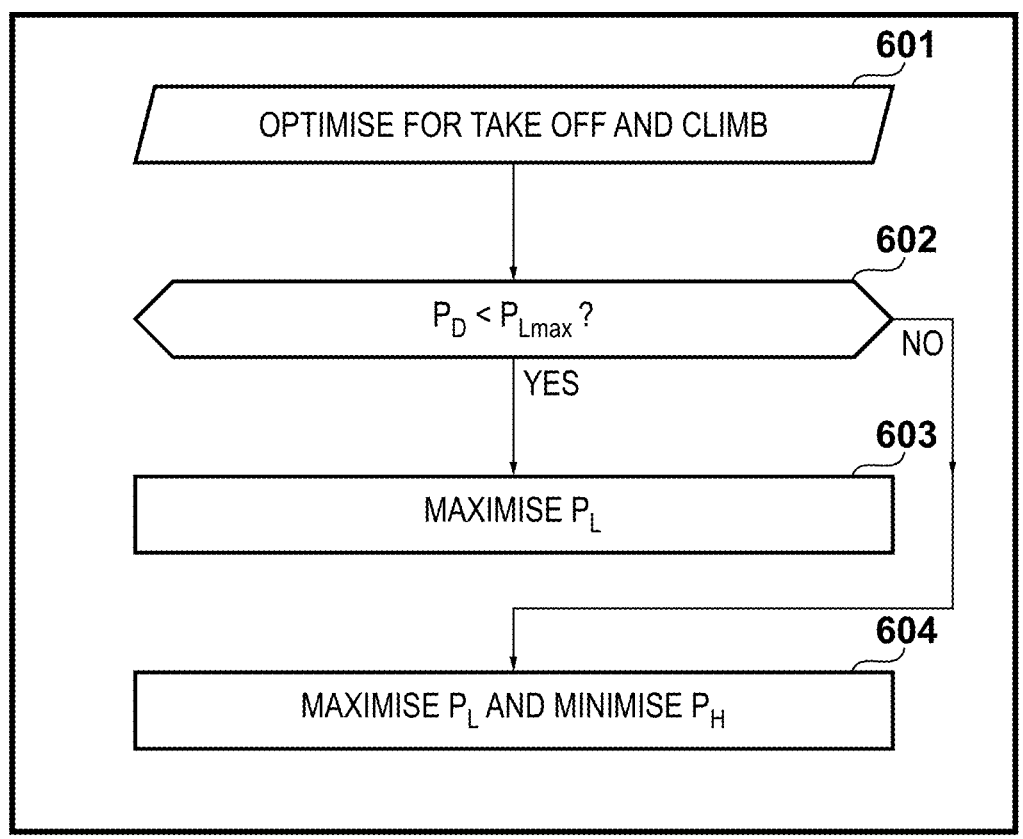
FIG. 6 shows a procedure to optimise operation of the engine of FIG. 1 during maximum climb or maximum take-off conditions.

In a similar way to the situation of FIG. 6, should the power demand $P_D$ be greater than the maximum power rating of the HP motor-generator 117, $P_{Hmax}$, then the question asked at step 702 will be answered in the negative. In this case, control proceeds to step 704 where the optimiser 402 maximises the power generation by the HP motor-generator 117, $P_H$, and minimises the power generation by the LP motor-generator 119, $P_H$. Thus, the HP motor-generator 117 is directed to generate $P_{Hmax}$ and the LP motor-generator 119 is directed to generate the remainder, $P_D$-$P_{Hmax}$.

In an embodiment, should spare capacity be available from the HP motor-generator 117, then the optimiser 402 may elect to divert $P_{Hmax}$-$P_D$ to the LP motor-generator 119 which may further reduce fuel consumption.

FIG. 8

Following the identification of an approach idle condition by the classifier module 401, the optimiser 402 enters the corresponding optimisation routine at step 801. At step 802, a question is asked as to whether the power demand $P_D$ is less than the maximum power rating of the LP motor-generator 119, $P_{Lmax}$. If so, then control proceeds to step 603 where the optimiser 402 maximises the power generation by the LP motor-generator 119, $P_L$. The excess capacity of the LP motor-generator 119, $P_{Lmax}$-$P_D$, is transferred to the HP motor-generator 117.

This has two effects. First, extraction of the maximum power possible from the low-pressure spool significantly reduces the low-pressure spool rotational speed, $N_L$. Recalling that in the engine 101 the fan 102, which is primary thrust generating element, rotates with the low-pressure spool, it will be clear that a reduction in $N_L$ reduces the thrust generated by the engine 101. This relaxes the requirement to use high drag devices on the airframe to achieve a required descent rate. This reduces noise and reduces fuel consumption.

Second, on approach, the engine idle setting is often constrained by the requirement for the engine to respond to a throttle transient in a timely manner—in the event of a go-around, the engine must deliver full rated thrust as quickly as possible. Initial high-pressure spool speed $N_H$ has a powerful effect on the response time during an engine acceleration, so maximising $N_H$ at idle significantly reduces the engine acceleration time. However, this is usually at the expense of a low idle thrust.

The inventor has found that by transferring power from the low-pressure spool to the high-pressure spool allows a higher $N_H$ and thus a shorter response time, along with a reduced idle thrust due to the lower $N_L$. It has been demonstrated that in an engine of the type described herein, 105 kilowatts of power transfer achieves a sufficiently high $N_H$ and a 75 percent reduction in idle thrust.

If the power demand $P_D$ is greater than the maximum power rating of the LP motor-generator 119, $P_{Lmax}$, then the question asked at step 802 will be answered in the negative. In this case, control proceeds to step 804 where the optimiser 402 maximises the power generation by the LP motor-generator 119, $P_L$, and minimises the power generation by the HP motor-generator 117, $P_H$. Thus, the LP motor-generator 119 is directed to generate $P_{Lmax}$ and the HP motor-generator 117 is directed to generate the remainder, $P_D$-$P_{Lmax}$.

In an embodiment, the optimiser 402 is further configured to identify that maintaining the requisite $N_H$ will cause unsafe operation of the low-pressure compressor 104. This may be caused by the operating point of the LP low-pressure compressor 104 becoming too close to surge or to choke. In response to the onset of such a condition, the fuel flow $W_F$ may be increased.

Alternatively, in order to reduce fuel burn on approach, the optimiser 402 may be configured to supplement the HP motor-generator using an energy storage device, for example the battery 305 via control of the $P_{BAT}$ parameter, or another energy source such as the auxiliary power unit on the aircraft. In this way, community emissions on approach may be reduced.

FIG. 9

Figure 9:
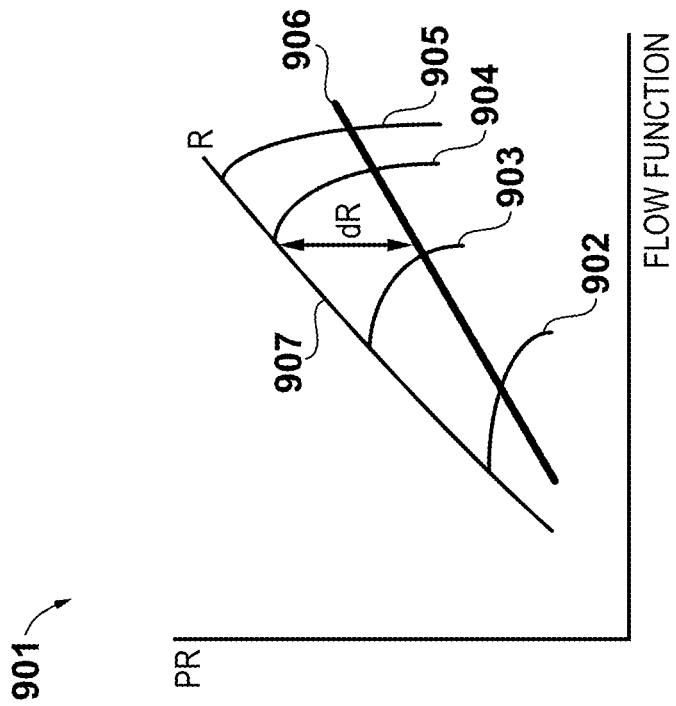
FIG. 9 shows a characteristic for an axial flow compressor.

One of the primary considerations for control of a gas turbine engine is the prevention of surge in the compression stages. A characteristic 901 for an axial flow compressor, such as low-pressure compressor 104 or high-pressure compressor 105, is shown in FIG. 9.

The characteristic 901 plots pressure ratio against flow function, which in this case is non-dimensional flow (W√T/P). The characteristic 901 shows a plurality of non-dimensional speed lines 902, 903, 904, 905, along with the compressor steady state working line 906, which is the locus of operating points for various steady state throttle settings at different non-dimensional speeds. In addition, the surge line 907 is shown, which is the locus of points at which the compressor enters surge at the various non-dimensional speeds. For a given value of the flow function, the pressure ratio at which surge is encountered is denoted R. The difference in pressure ratio on the working line 906 and the value of R on the surge line 907 for a given value of the flow function is denoted dR. Therefore, the surge margin for a given compressor operating point may be defined as dR/R.

It is important to maintain a degree of surge margin at all points in the operational envelope. This is to mitigate random threats, such as inlet flow instabilities due to crosswinds or turbulence, for example. To a first order, it is often recommended for low-pressure compressors to have around 15 percent surge margin, and high-pressure compressors to have around 20 percent surge margin. A significant proportion of the surge margin, typically up to half, is to make allowance for transient excursions of the working line during acceleration and deceleration manoeuvres. Such transient phenomena will be described further with reference to FIGS. 10A, 10B, 11A, and 11B.

FIGS. 10A & 10B

Figure 10B:
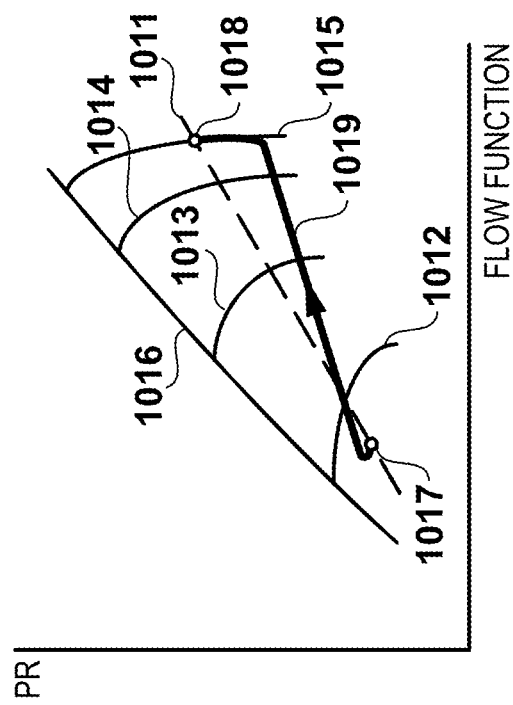
FIGS. 10A and 10B show transient working lines for, respectively, a high-pressure compressor and a low-pressure compressor.
Figure 10A:
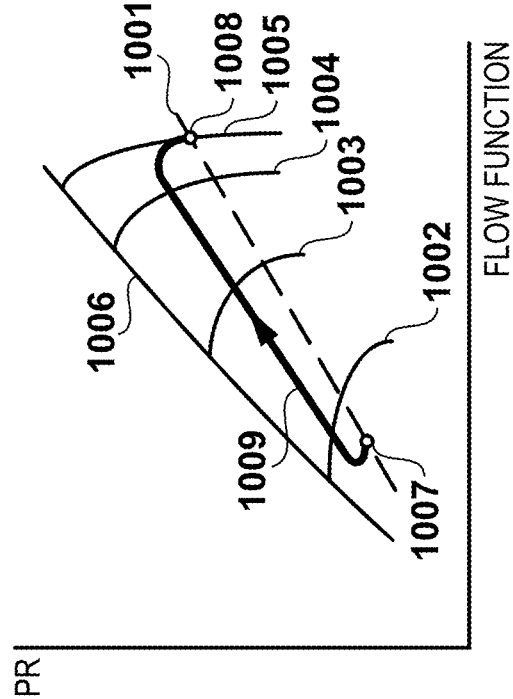

Characteristics for the high-pressure compressor 105 and the low-pressure compressor 106 showing transient phenomena during acceleration events are plotted in FIGS. 10A and 10B respectively.

In FIG. 10A, the high-pressure compressor steady-state working line 1001 is shown along with lines of constant corrected speed 1002, 1003, 1004, and 1005, and the surge line 1006. During an acceleration manoeuvre, the high-pressure compressor 105 moves from an initial operating point 1007 to a final operating point 1008 via a transient working line 1009 above the steady-state working line 1001.

Similarly, in FIG. 10B, the low-pressure compressor steady-state working line 1011 is shown along with lines of constant corrected speed 1012, 1013, 1014, and 1015, and the surge line 1016. During an acceleration manoeuvre, the low-pressure compressor 106 moves from an initial operating point 1017 to a final operating point 1018 via a transient working line 1019 which crosses the steady-state working line 1011.

During the acceleration manoeuvre, the high-pressure compressor 105 initially moves towards surge due to the flow compatibility requirement with the high-pressure turbine 107. The flow function of the high-pressure turbine 107 ($W_{405}\sqrt{T_{405}}/P_{405}$) is substantially fixed during most operating conditions of the engine 101, due to the nozzle guide vanes therein being choked. In order to initiate the acceleration manoeuvre, for example due to an increase in power lever angle setting, the amount of fuel metered by the fuel metering unit 308 ($W_F$) is increased. This leads to an increase in turbine entry temperature, $T_{405}$. Normally, the high-pressure spool speed $N_H$ is prevented from changing instantaneously due to its inertia. Consequently, the operating point of the high-pressure compressor 105 moves up a line of constant corrected speed. As the overfuelling continues and the high-pressure spool inertia is overcome, the operating point moves along the transient working line 1009 parallel to the surge line 1006. As the acceleration finishes, the high-pressure compressor 105 adopts its final operating point 1008 on the steady-state working line 1001.

Referring now to FIG. 10B, at the initiation of the acceleration manoeuvre, the operating point of the low-pressure compressor 104 moves a little towards surge, and then crosses the steady-state working line 1011. The initial move towards surge is due to the reduction in flow in the high-pressure compressor 105 due to the high-pressure spool inertia as described above. As the speed of the high-pressure compressor 105 increases it can accept more flow. However, due to the greater inertia of the low-pressure spool (recalling that it drives the fan 102 via the gearbox 111), it cannot accelerate at the same rate and so the operating points of the low-pressure compressor 104 during the acceleration manoeuvre fall below the steady-state working line 1011.

It will be understood that handling during acceleration manoeuvres may significantly affect the design of the compressor turbomachinery and impose requirements for systems to manage the transients by either modifying the transient working line or the surge line, such as variable guide vanes and bleed valves.

FIGS. 11A & 11B

By contrast, in the engine 101 it is possible to utilise the HP motor-generator 117 and optionally the LP motor-generator 119 to reduce the transient excursion.

Figure 11B:
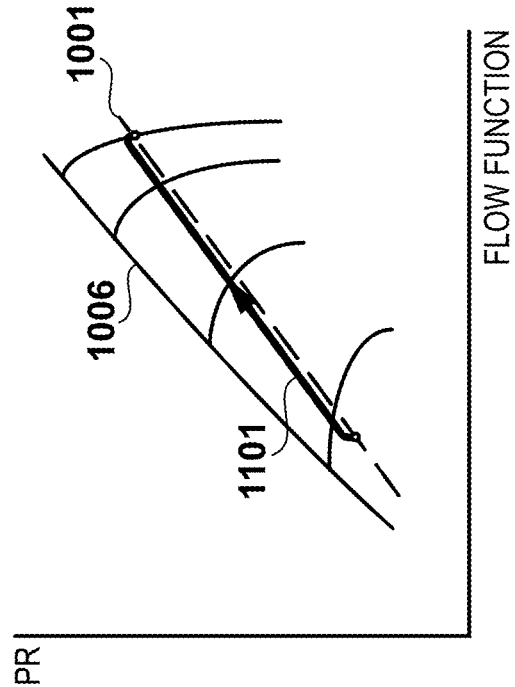
FIGS. 11A and 11B show transient working lines for, respectively, a high-pressure compressor and a low-pressure compressor where control of power offtake and/or input is implemented.
Figure 11A:
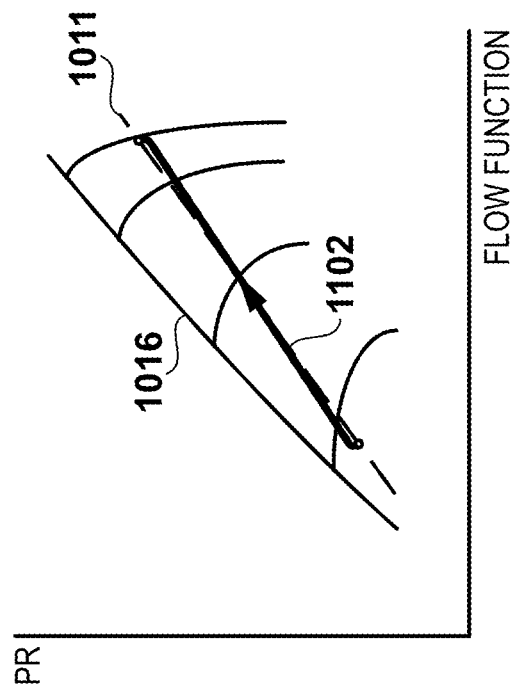

FIG. 11A shows the characteristic for the high-pressure compressor 105 when the HP motor-generator 117 is used to overcome the high-pressure spool inertia. It can be seen that for the same degree of overfuelling, the transient working line 1101 is much closer to the steady-state working line 1001 and further from the surge line 1006. Thus for a given compressor configuration, this technique may either be used to improve surge margin during an acceleration manoeuvre, or facilitate a greater degree of overfuelling (up to the stator outlet temperature limit) and thus a faster acceleration time.

FIG. 11B shows the characteristic for the low-pressure compressor 104 during application of the same technique on the low-pressure spool using the LP motor-generator 119. It may be seen that the transient working line 1102 is again much closer to the steady-state working line 1011 due to the reduction in effective low-pressure spool inertia by the LP motor-generator 119.

FIG. 12

Figure 12:
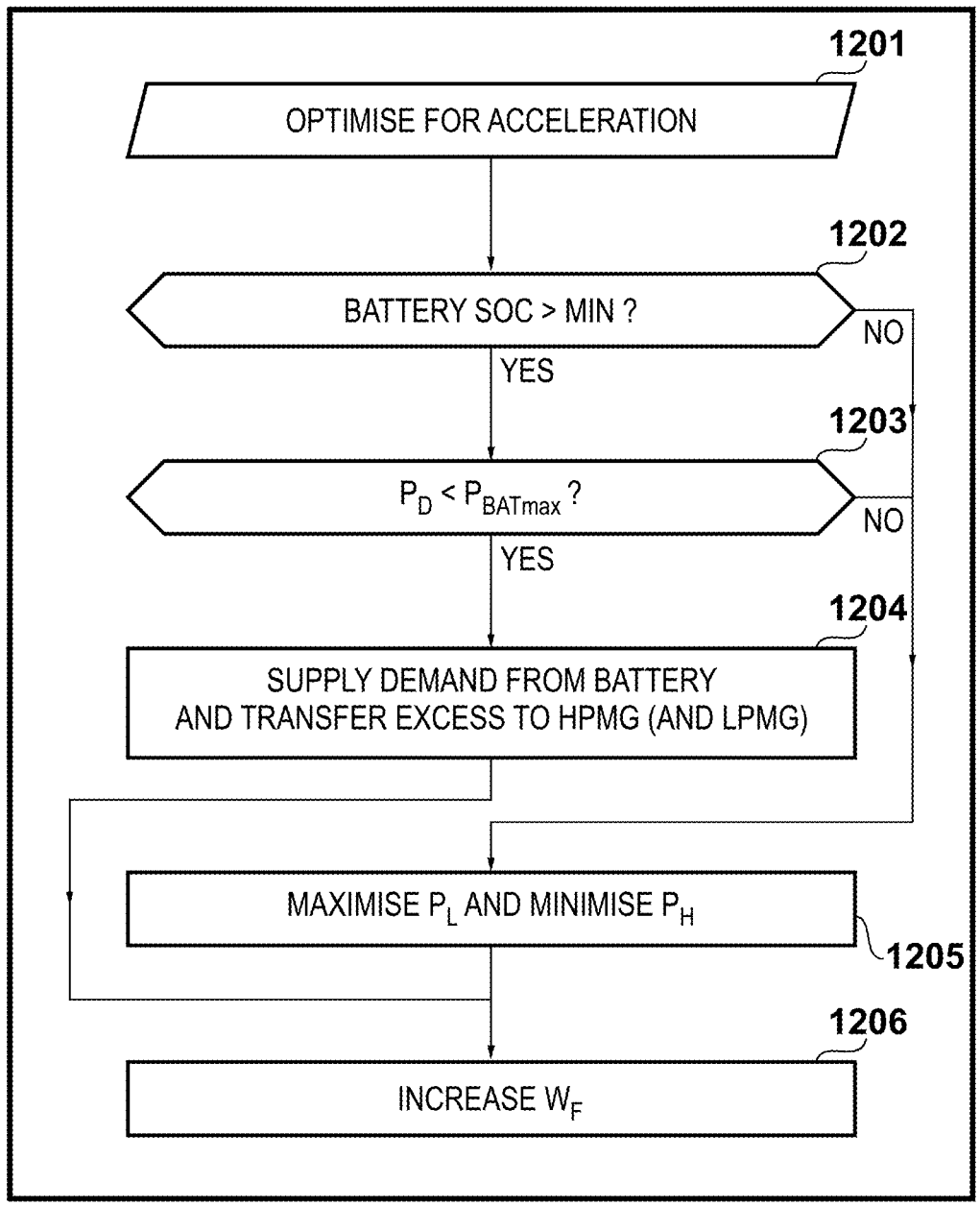
FIG. 12 shows a procedure to optimise operation of the engine of FIG. 1 during an acceleration event.

Steps carried out by the optimiser 402 to achieve the advantages described previously for an acceleration event are set out in FIG. 12.

Following the identification of an acceleration condition by the classifier module 401, the optimiser 402 enters the corresponding optimisation routine at step 1201. In the present embodiment, with an energy storage system such as the battery 305 available on the dc bus 303, a question is asked at step 1202 as to whether the battery state of charge is greater than a minimum value. As will be appreciated by those skilled in the art, this may not be absolutely zero but instead will be a minimum state of charge, for example 20 percent, below which the battery may be damaged.

If so, a further question is asked at step 1203 as to whether the unmodified total aircraft power demand $P_D$ (i.e. prior to any modification thereof to account for battery optimisation) is less than the maximum power available from the battery 305, $P_{BATmax}$. If so, then control proceeds to step 1204 where the optimiser 402 overrides any concurrent battery optimisation processes, and fully supplies the power demand Po using the battery 305, with any excess being supplied to the HP motor-generator 117 to overcome the HP spool inertia. Optionally, any further excess may be supplied to the LP motor-generator 119.

Should either of the questions asked at steps 1202 or 1203 be answered in the negative, i.e. the battery 305 has a minimal state of charge, or the unmodified total aircraft power demand $P_D$ is greater than the maximum power of the battery 305, $P_{BATmax}$ (or if indeed the particular embodiment of the engine 101 does not include a battery), then control proceeds to step 1205 in which power generation by the LP motor-generator 119, $P_L$, is maximised and power generation by the HP motor-generator 117, $P_H$, is minimised.

Following optimisation of the power generation strategy to satisfy the power demand $P_D$ in the preceding steps, the fuel flow $W_F$ metered by the fuel metering unit 308 is increased at step 1206.

FIG. 13

When a deceleration event is initiated, fuel flow by the fuel metering unit 308 is reduced. In the opposite sense to the scenario described above, as fuel flow is decreased, the turbine entry temperature decreases instantaneously. This is because, as described previously, during the majority of operating scenarios, the nozzle guide vanes in the high-pressure turbine 107 are choked and the flow function remains constant. As the high-pressure spool speed $N_H$ is prevented from changing instantaneously due to its inertia, the reduction in turbine entry temperature $T_{405}$ causes the operating point of the high-pressure compressor 105 to move down a line of constant corrected speed on its characteristic. This manifests as an increase in mass flow $W_{31}$ and a decrease in pressure $P_{31}$ at the exit of the high-pressure compressor 105.

The result of this for the combustor 106 is that not only is the amount of fuel delivered lower, but the mass flow $W_{31}$ therethrough has increased. This means that the combustor 106 operates at a lower fuel-air ratio (FAR) than normal, which risks weak extinction (also known as lean blowout).

Figure 13:
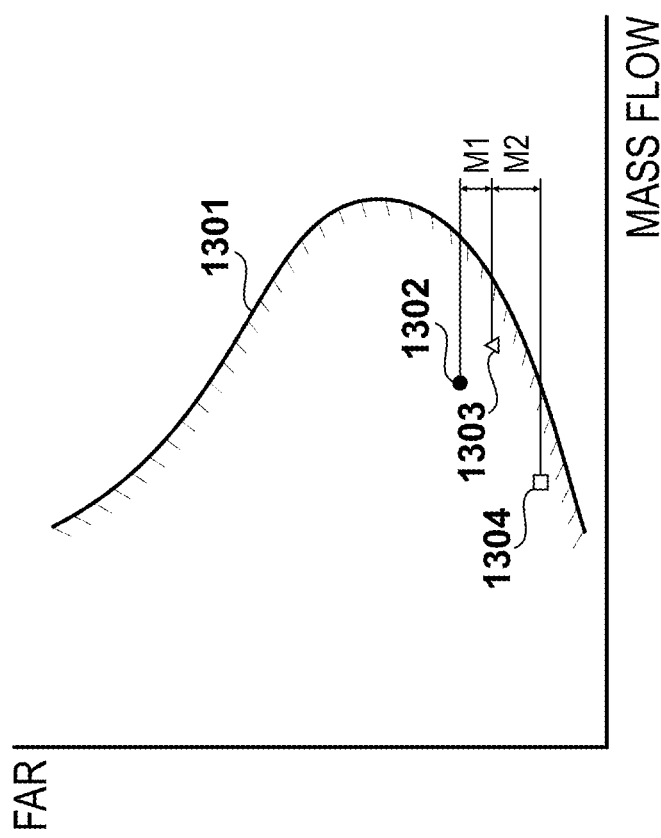
FIG. 13 shows a plot of fuel-air ratio against mass flow in a combustor for different operating conditions.

Referring to FIG. 13, which is a plot of FAR against flow function, the weak extinction boundary 1301 for the combustor 105 is illustrated. Corrected flow through the combustor 105 to the right of the weak extinction boundary 1301 results in extinction of the flame and is an unacceptable operating condition. A steady-state FAR for a particular mass flow through the combustor 106, is shown at point 1302. The constraint on how aggressive a deceleration manoeuver may be is dictated by the allowable underfuelling margin. In prior art engines, in which the flow function increases slightly at the outset of the deceleration manoeuver, the underfuelling margin is limited to $M_1$ due to the proximity of the fuel-air ratio to the weak extinction boundary 1301 during the deceleration, shown at point 1303.

However, by actively reducing the speed of the high-pressure spool at the initiation of and during the deceleration event by the HP motor-generator 107, the operating point of the high-pressure compressor 105 is no longer forced to move down a constant speed line at the outset of the manoeuvre. Instead, there is only a slight deviation from the steady state working line due to the reduction in turbine entry temperature, $T_{405}$. As the speed of the high-pressure compressor 105 substantially instantaneously begins to decelerate, the mass flow through the combustor 106 also reduces substantially instantaneously. As shown at point 1304 in FIG. 13, the additional margin $M_2$ allows a greater degree of underfuelling.

It will be understood that this approach allows the design of the combustor 106 to be optimised due to the greater weak extinction margin, and also allows the vehicle design to be optimised as a greater thrust reduction is achievable by the engine alone without resort to high drag devices to reduce forward airspeed in, for example, a slam decel manoeuvre.

It will also be appreciated that the approach provides a method of controlling weak extinction in the combustor 105. Using the engine model 404, for example, the onset of weak extinction may be identified by evaluating the current fuel-air ratio in the combustor 105. This may be achieved, for example, by utilising the flight Mach number, altitude and temperature to determine the mass flow in the engine 101, the characteristic of the fan 102 to determine the mass flow C into the core gas turbine, and the characteristics of the compressors 104 and 105 to determine the mass flow into the combustor 105. This may be combined with the commanded fuel flow $W_F$ along with a model of the combustion process to determine the fuel-air ratio.

In response to identifying that the fuel-air ratio is approaching the weak extinction boundary 1301, the EEC 123 may use the power controller 309 to extract mechanical shaft power from the high-pressure spool using the HP motor-generator 117 to prevent a further drop in fuel-air ratio in the combustor 105.

FIG. 14

Figure 14:
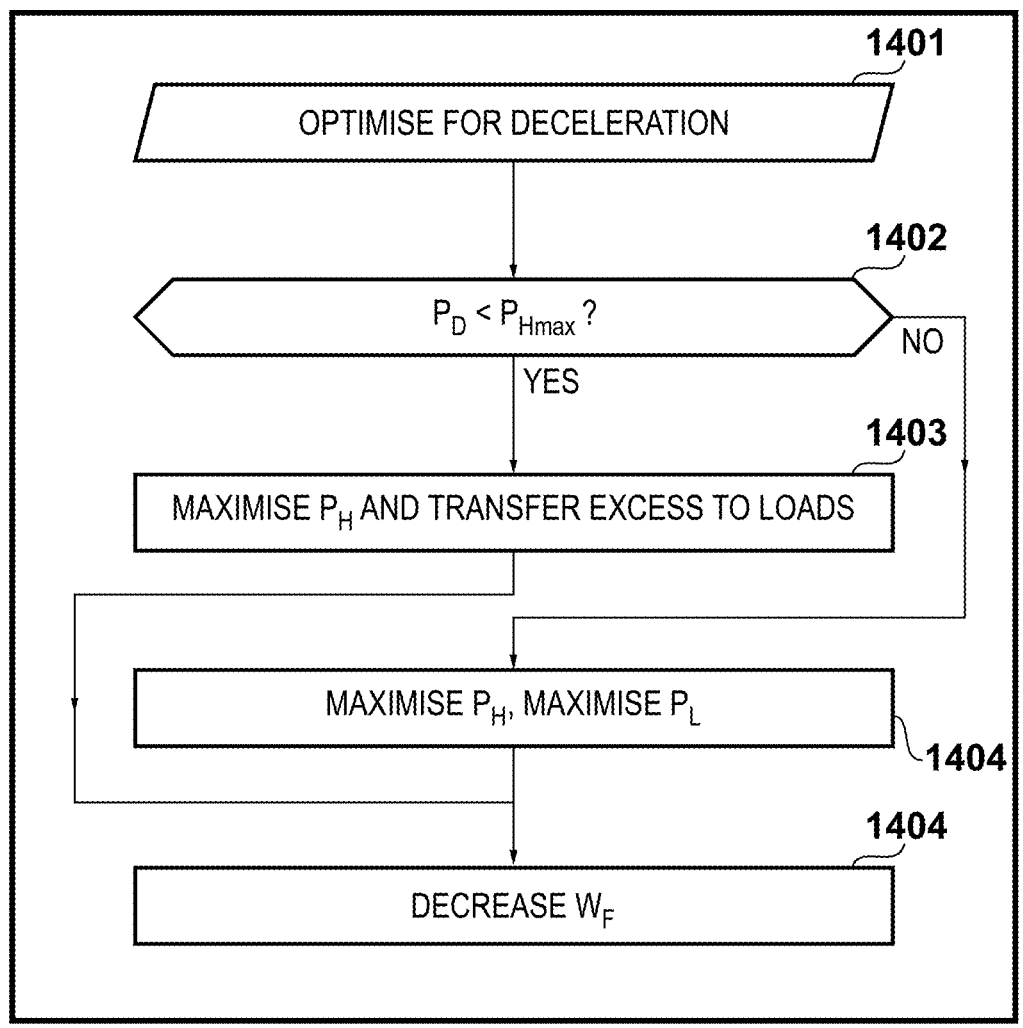
FIG. 14 shows a procedure to optimise operation of the engine of FIG. 1 during a deceleration event.

Steps carried out by the optimiser 402 to achieve the advantages described previously for a deceleration event are set out in FIG. 14.

Following the identification of a deceleration condition by the classifier module 401, the optimiser 402 enters the corresponding optimisation routine at step 1401. A question is asked at step 1402 as to whether the power demand $P_D$ is less than the maximum power generation capability of the HP motor-generator 117, $P_{Hmax}$. If so, then control proceeds to step 1403 whereupon the power generation of the HP motor-generator 117, $P_H$, is maximised to satisfy $P_D$.

In the present embodiment, the excess capacity $P_{Hmax}$-$P_D$ is transferred to other loads. In an embodiment, the excess capacity is directed to an energy storage system, such as the battery 305. As described previously, the energy storage system may additionally or alternatively comprise a capacitor. Additionally or alternatively, the excess capacity may be directed to an electrical consumer such as the anti-icing system 304, which may be the nacelle anti-ice system of the engine 101. Alternatively, it may be the wing anti-ice system of the vehicle on which the engine 101 is installed.

If it is inappropriate to direct excess capacity anywhere, for example if further heating of using anti-ice systems may cause damage given the atmospheric conditions, or the energy storage system is full, then in an embodiment step 1403 solely maximises $P_H$ up to $P_D$ to assist in the reduction of the high-pressure spool speed.

If the question asked at step 1402 is answered in the negative, to the effect that the power demand $P_D$ is greater than the maximum power generation capability of the HP motor-generator 117, $P_{Hmax}$, then control proceeds to step 1404 where first the power generation of the HP motor-generator 117, $P_H$, is maximised, then the power generation of the LP motor-generator 119, $P_L$, is maximised to supply remainder of $P_D$.

Following optimisation of the power generation strategy to satisfy the power demand $P_D$ in the preceding steps, the fuel flow $W_F$ metered by the fuel metering unit 308 is reduced at step 1206.

In an alternative, embodiment the excess capacity $P_{Hmax}$-$P_D$ may be directed to the LP motor-generator 119. This may be possible due to this excess power representing a small proportion of the power generated by the low-pressure turbine 108, therefore leading to a very small change in thrust generated by the fan 102. Whilst the change in thrust may be small, the effect on the high-pressure spool is large in terms preventing an increase in mass flow at the point of reduction of fuel flow, and thereby on the ability to prevent weak extinction.

FIGS. 15A & 15B

When an increase in power demand $P_D$ occurs, the power controller 309 must respond by in turn demanding an increase in power output by the gas turbine engine.

Figure 15B:
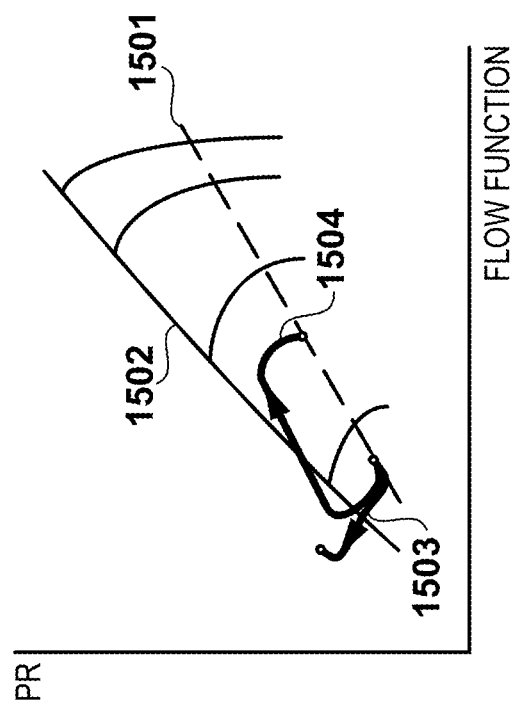
FIGS. 15A and 15B show, respectively, an increase in electrical power demand, and the corresponding transient working line for the compressor on the same spool as the motor-generator meeting said power demand.
Figure 15A:
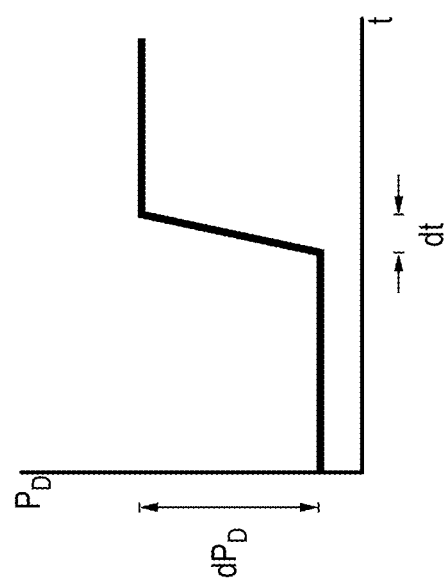

FIG. 15A illustrates an exemplary increase in power demand $P_D$ of magnitude $dP_D$ within a timeframe dt. FIG. 15B shows a characteristic for an exemplary axial flow compressor, forming part of a single gas turbine spool coupled to a generator. In order to satisfy the increase in power demand $dP_D$ the specific work of the turbine must increase. The steady-state working line is shown at 1501, with the surge line shown at 1502. To increase the work by the engine, an increase in fuel flow is required.

For the situation in which the generator load follows the step of FIG. 15A, the spool may be held at constant corrected speed, or allowed to accelerate to a higher non-dimensional speed. The movement of the operating point of the exemplary compressor for each option is shown on the characteristic of FIG. 15B. Line 1503 shows the movement of the operating point at constant corrected speed. Line 1504 shows the movement of the operating point to a higher corrected speed. It may be seen that responding in this manner would mean that as the generator load increases, the compressor non-dimensional speed exhibits a slight initial reduction as a greater proportion of the turbine work is used to drive the generator rather than the compressor. As fuel flow increases, the compressor operating point moves towards and in both examples exceeds the surge line 1502.

Thus it may be seen that at low engine throttle settings in particular, such an increase in power demand $P_D$ may unchecked cause a compressor to enter surge, requiring additional handling systems prevent this and guarantee adequate surge margin. In practice, this situation may for example occur in an aircraft engine during descent when anti-ice systems need to be enabled but the engines are at an idle setting.

FIGS. 16A & 16B

In the present embodiment, however, the approach is taken to utilise the energy storage system to mitigate the possibility of surge. Thus, as illustrated in FIG. 16A, the same increase in power demand $P_D$ of magnitude $dP_D$ within a timeframe dt is demanded. Instead of this solely being met by one or both of the HP motor-generator 117 and the LP motor-generator 119, it is met during the manoeuvre by the battery 305. Thus, as shown in the Figure, initially the power demand is met by the battery 305, as shown by the shaded region 1601. As the engine 101 accelerates, the proportion provided by the motor-generator(s) increases gradually until the new power demand is fully met by the engine 101.

Figure 16B:
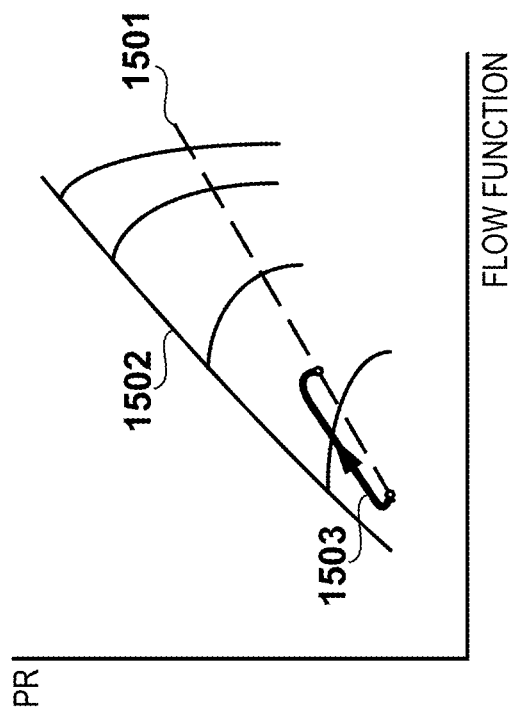
FIGS. 16A and 16B show, respectively, an increase in electrical power demand, and the corresponding transient working line for the compressor on the same spool as the motor-generator meeting said power demand with assistance from an energy storage system.
Figure 16A:
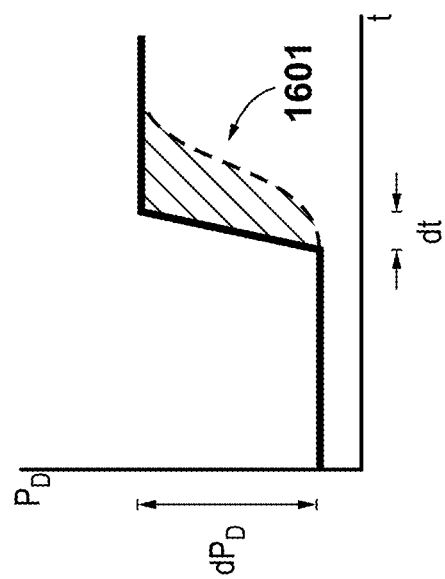

FIG. 16B shows the transient working line 1602 on a compressor characteristic when this approach is adopted. As the initial increase in power demand is fulfilled by a different energy source to the core gas turbine engine, there is no attendant drop in compressor non-dimensional speed. In addition, the increase in fuel flow may be tempered, so that the raise in working line during the transient manoeuvre is not as great as in the example of FIGS. 15A and 15B. In this way, adequate surge margin is maintained, potentially allowing a more optimum compressor design and/or removal of handling systems.

In an alternative embodiment, the battery 305 may provide all of the higher power demand whilst the engine 101 accelerates to a higher corrected speed, at which point provision of the power demand Po is switched from the battery to the motor-generator(s) in the engine 101.

FIG. 17

Figure 17:
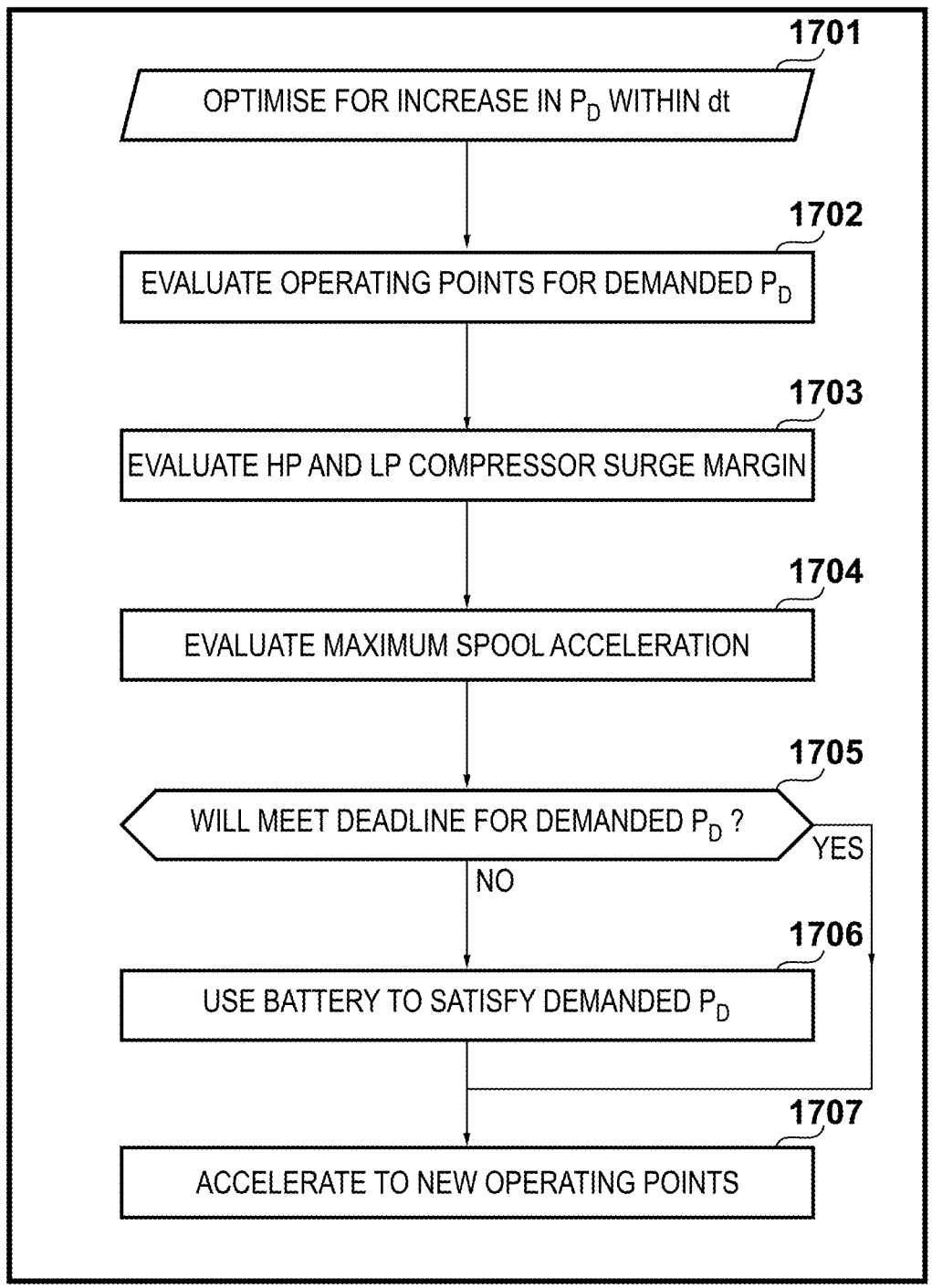
FIG. 17 shows a procedure to optimise operation of the engine of FIG. 1 in the event of an increase in electrical power demand.

Steps carried out by the optimiser 402 to achieve the functionality described previously for an increase in power demand $P_D$ are set out in FIG. 17.

Following the identification of an increase in power demand within a given timeframe dt by the differentiator 502 in the classifier module 401, the optimiser 402 enters the corresponding optimisation routine at step 1701. At step 1702, the optimiser 401 evaluates the operating points of the low-pressure compressor 104 and the high-pressure compressor 105 for the demanded $P_D$. In the present embodiment, this may be achieved using the engine model 404 and knowledge of the current power lever angle setting etc. Alternatively, a look-up table or similar may be used instead.

At step 1702, the current surge margin in the low-pressure compressor 104, $dR_L/R_L$, and the current surge margin in the high-pressure compressor 105, $dR_H/R_H$ are evaluated, again using the engine model 404 in the present embodiment, or suitable alternatives if required.

At step 1703, the maximum allowable rate of acceleration for each spool is evaluated given the requirement to maintain adequate surge margin during the manoeuvre. In the present embodiment, this may be achieved by referring to the respective acceleration schedules for the spools.

A question is then asked as to whether acceleration of the high-pressure spool and low-pressure spool only will meet the required power demand within the demanded timeframe. If not, for example if the new power demand is very high or is required in a very short amount of time, then control proceeds to step 1706 where a decision is taken to utilise the battery 305 (or other energy storage unit such as a capacitor) to satisfy the demanded $P_D$.

Then, or if the question asked at step 1705 was answered in the negative, the high-pressure and low-pressure spools are accelerated to their new operating points by increasing the fuel flow metered by the fuel metering unit 308. As described previously, at this point the new power demand may then be fully met by one or more of the HP motor-generator 117 and the LP motor-generator 119. The transition may be gradual, or the battery 305 may solely supply the additional power demand $dP_D$ until the new operating points are achieved.

FIGS. 18A & 18B

Figure 18B:
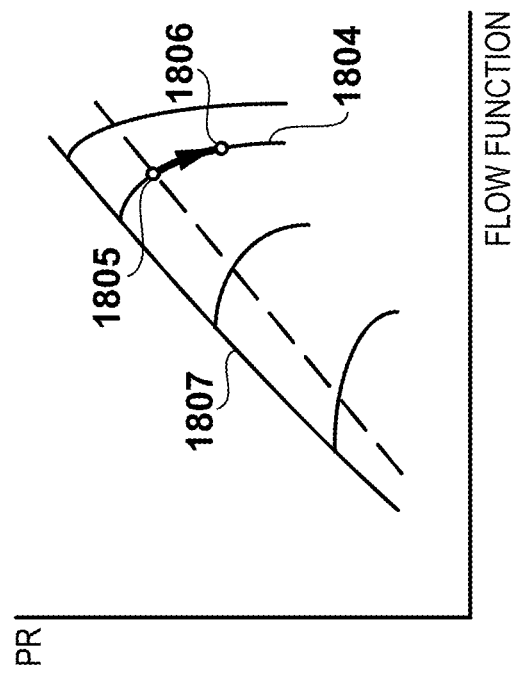
FIGS. 18A and 18B show characteristics for, respectively, a high-pressure compressor and a low-pressure compressor and the movement of operating point when shaft power is transferred from the low-pressure spool to the high-pressure spool.
Figure 18A:
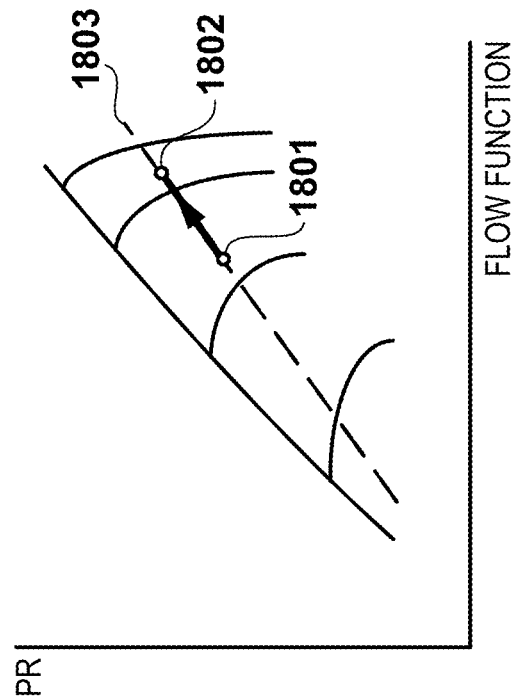

The effect of power transfer from the LP motor-generator 119 to the HP motor-generator 117 on the operating point of the high-pressure compressor 105 is shown in FIG. 18A on the compressors' characteristic. The effect on the operating point of the low-pressure compressor 104 is shown on its characteristic in FIG. 18B.

As power is added to the high-pressure spool, the pressure ratio and flow function increase, as shown in FIG. 18A by the transition from an initial operating point 1801 to a final operating point 1802 at a higher non-dimensional speed on the compressor's working line 1803.

Extraction of power from the low-pressure spool lowers the working line of the low-pressure compressor 104. Recalling that the low-pressure compressor rotational speed is fixed relative to the fan 102, at constant thrust the low-pressure compressor operating point may only move on a constant non-dimensional speed line, in this case speed line 1804. Due to the increase in flow function in the high-pressure compressor 105, the low-pressure compressor 104 is unthrottled and so also sees a raise in flow function. Thus the operating point moves from an initial operating point 1805 to a final operating point 1806 on speed line 1804 away from the surge line 1807.

It will therefore be understood that controlling the degree of electrical power generated by one or both of the HP motor-generator 117 and the LP motor-generator 119 allows the mass flow rate of the core flow C to be varied even at fixed thrust settings. Recalling that the bypass ratio of the engine 101 is defined as the ratio of the mass flow rate of the flow B through the bypass duct to the mass flow rate of the flow C through the core gas turbine, this allows the bypass ratio of the engine 101 to be varied. This has particular advantages in terms of optimising the jet velocity of the engine 101 for particular airspeeds.

In an embodiment, power transfer may be used to further vary the bypass ratio by operating the LP motor-generator 119 as a generator and operating the HP motor-generator 117 as a motor.

In this way, it will be understood that the engine 101 may operate as a variable-cycle engine.

It will also be seen that transfer of power from the low-pressure spool to the high-pressure spool is an effective way of increasing surge margin in both compressors. It should also be noted that these fundamental effects occur even in the absence of active power transfer: should the power demand $P_D$ be greater than or equal to the capability of the LP motor-generator 119, then an increase in surge margin is still achieved by satisfying the power demand $P_D$ by maximising low-pressure spool offtake. This is because a greater enthalpy drop is required across the low-pressure turbine 108, which requires a greater mass flow. The greater mass flow through the high-pressure compressor 105, whilst not as high as with power transfer, still unthrottles the low-pressure compressor 104 and increases its surge margin. Thus it will be understood that this strategy provides a suitable means for increasing surge margin in the engine 101.

FIG. 19

Figure 19:
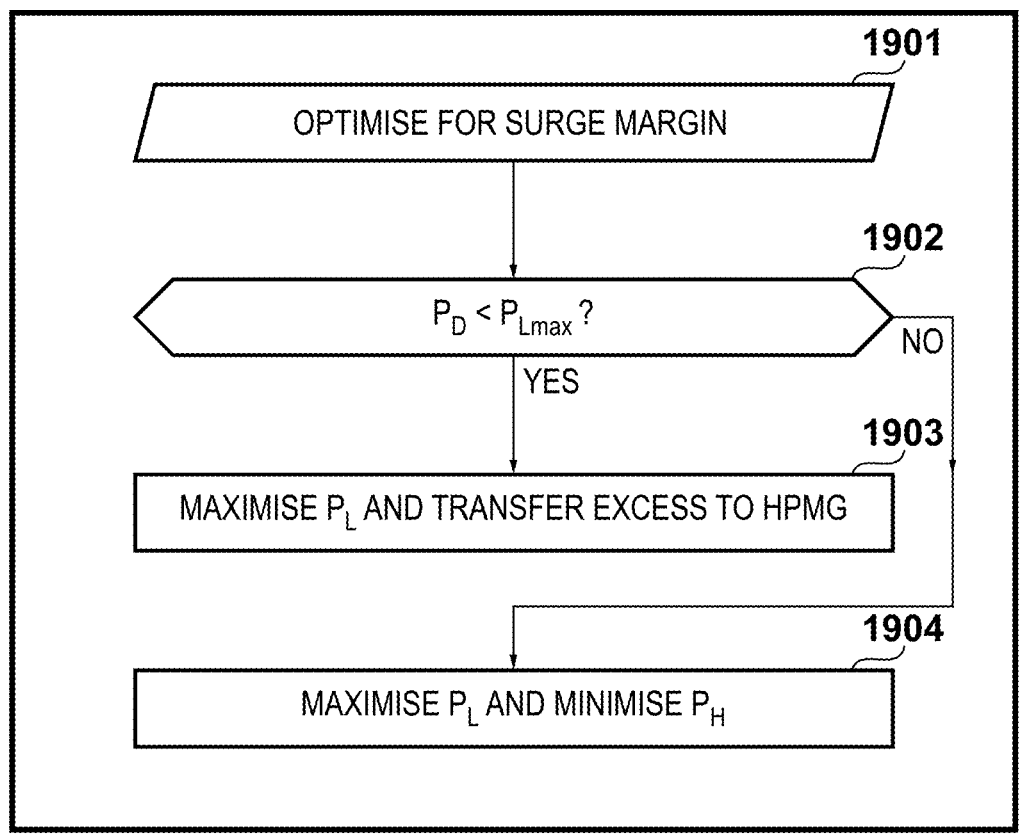
FIG. 19 shows a procedure to optimise power offtake and/or transfer to increase surge margin.

Steps carried out by the optimiser 402 to increase surge margin are therefore set out in FIG. 19.

Following the identification of an operating condition in which surge margin needs to be increased by the classifier module 401, the optimiser 402 enters the corresponding optimisation routine at step 1901. As described previously, operating conditions such as in high cross winds or other unsteady inlet flow phenomena may trigger entry into this routine.

At step 1902, a question is asked as to whether the current power demand $P_D$ is less than the maximum power rating of the LP motor-generator 119, $P_{Lmax}$. If so, then control proceeds to step 1903 where the optimiser 402 maximises the power generation by the LP motor-generator 119, $P_L$ to increase surge margin in the low-pressure compressor 104, and transfers any excess electrical power $P_{Lmax}$-$P_D$ to the HP motor-generator 117 to raise its operating point up its working line, also increasing surge margin.

If the question asked at step 1902 is answered in the negative, to the effect that the LP motor-generator 119 is not solely capable of satisfying the power demand $P_D$, then control proceeds to step 1904 where the optimiser 402 maximises the power generation by the LP motor-generator 119, $P_L$ to increase surge margin in the low-pressure compressor 104. Recall that power extraction from the high-pressure spool normally moves the operating point of the high-pressure compressor 105 down its normal working line, but that the extraction of power from the low-pressure spool normally moves the operating point up its working line. Thus in step 1904 the optimiser 402 minimises power generation by the HP motor-generator 117, $P_H$ which substantially maintain its operating point at around its steady state value, or slightly higher on its working line.

FIGS. 20A & 20B

Figure 20A:
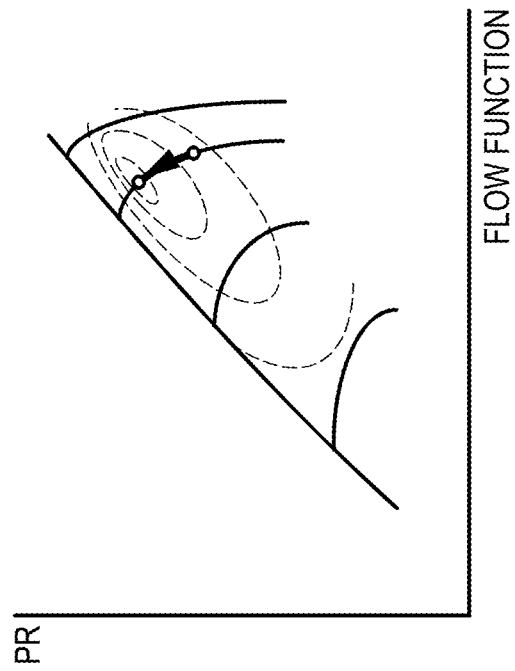
FIGS. 20A and 20B show characteristics for, respectively, a high-pressure compressor and a low-pressure compressor and the movement of operating point when shaft power is transferred from the high-pressure spool to the low-pressure spool.
Figure 20B:
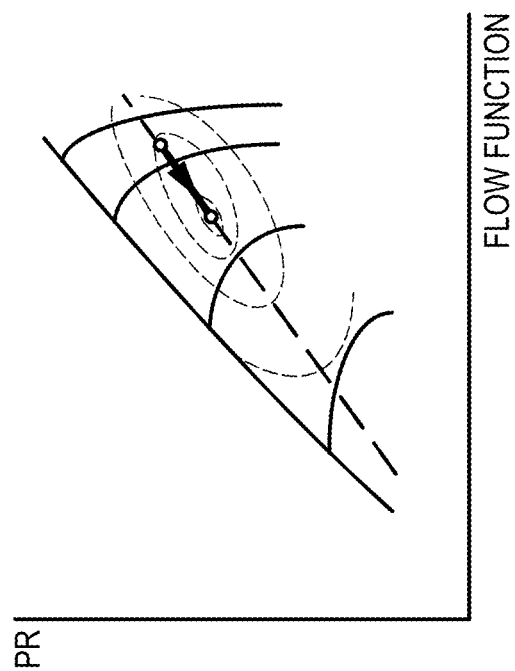

Whilst surge margin may be increased by the method of FIG. 19, it may in some cases be beneficial to reverse the direction of the power transfer such that power is transferred from the HP motor-generator 117 to the LP motor-generator 119. FIG. 20A shows the movement of the operating point of the high-pressure compressor 105 in this scenario. FIG. 20B shows the movement of the operating point of the low-pressure compressor 104 in this scenario. The characteristics include lines of constant isentropic efficiency for the compressors. It can be seen that the transfer of power from the high-pressure spool to the low-pressure spool may enable an increase in compression efficiency in the engine 101 by moving the operating points of the compressors into regions of high efficiency.

FIG. 21

Figure 21:
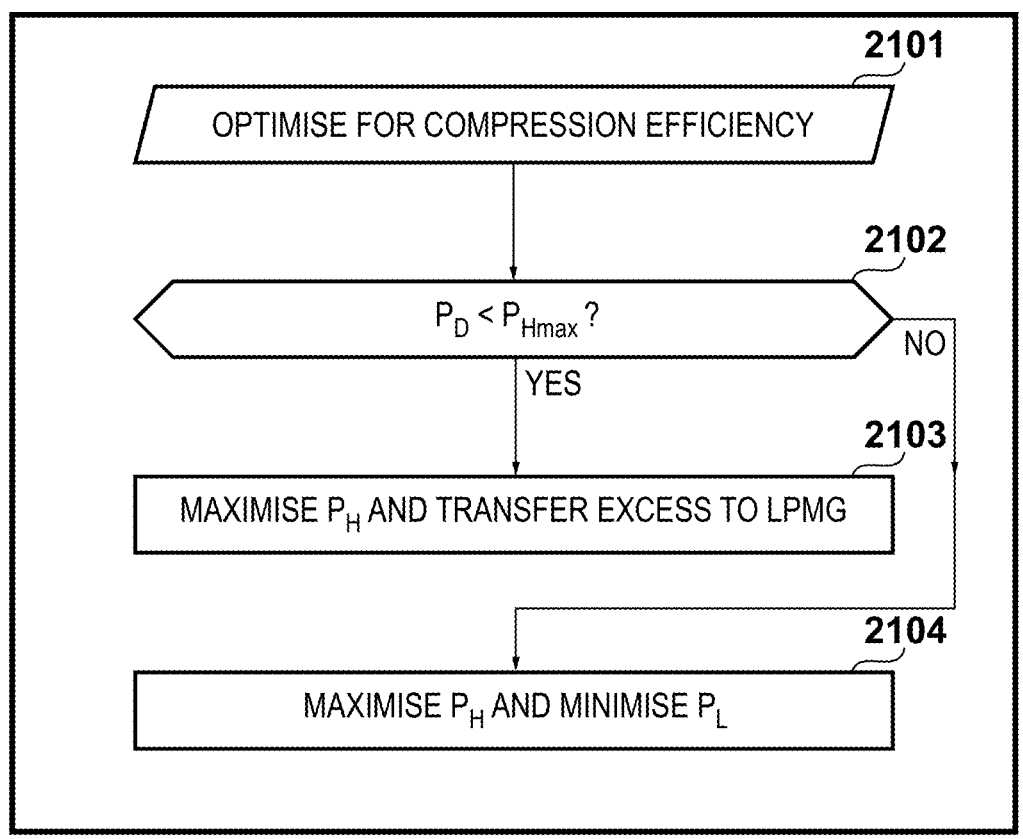
FIG. 21 shows a procedure to optimise power offtake and/or transfer to increase compression efficiency.
Figure 22:
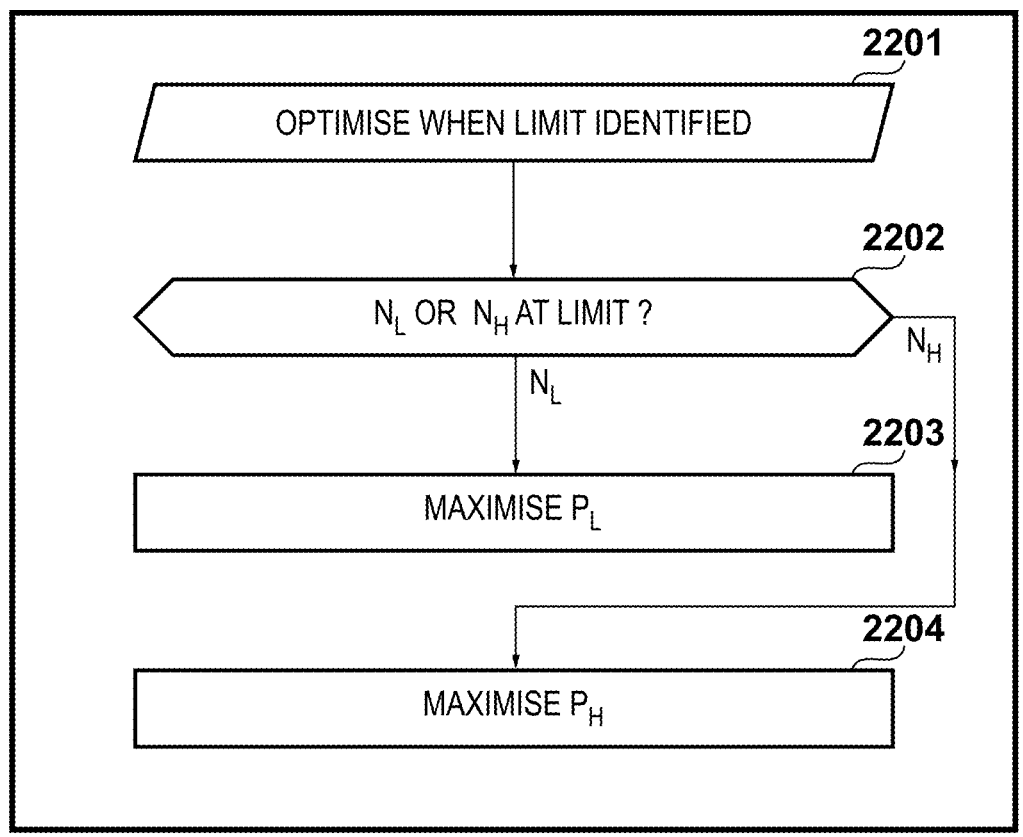
FIG. 22 shows a procedure to implement a speed limiter function.

Steps carried out by the optimiser 402 to increase compression efficiency are therefore set out in FIG. 21.

Following the identification of an operating condition in which compression efficiency may be increased by the classifier module 401, the optimiser 402 enters the corresponding optimisation routine at step 2101. As described previously, operating conditions such as sufficiently steady inlet flow may permit entry into this routine.

At step 2102, a question is asked as to whether the current power demand $P_D$ is less than the maximum power rating of the HP motor-generator 117, $P_{Hmax}$. If so, then control proceeds to step 2103 where the optimiser 402 maximises the power generation by the HP motor-generator 117, $P_H$ to increase compression efficiency in the high-pressure compressor 104, and transfers any excess electrical power $P_{Hmax}$-$P_D$ to the LP motor-generator 119 to lower its operating point on its working line, also increasing compression efficiency in this example.

If the question asked at step 2102 is answered in the negative, to the effect that the HP motor-generator 117 is not solely capable of satisfying the power demand $P_D$, then control proceeds to step 2104 where the optimiser 402 maximises the power generation by the HP motor-generator 117, $P_H$ to increase compression efficiency in the high-pressure compressor 105. Furthermore, the optimiser 402 minimises power generation by the LP motor-generator 119, $P_L$ to keep the low-pressure compressor 104 in as high a region of compression efficiency as possible.

FIG. 22

As described previously, it is also possible to utilise the HP motor-generator 117 and LP motor-generator 119 to implement speed limiting. This may provide advantages in terms of safety, by preventing overspeed conditions or by managing operation around keep-out zones for example speed ranges where vibration levels are high.

The limiter 503 monitors the shaft speeds $N_H$ and $N_L$. In an embodiment, the limiter triggers if a mechanical limit is exceed, i.e. purely on the basis of revolutions per minute. Alternatively, the limiter triggers on the basis of an aerodynamic limit, i.e. a corrected speed, and so takes temperatures into account. In this way, the breakdown of flow in the compressors may be prevented.

Thus, following the identification of a limit condition by the classifier module 401, the optimiser 402 enters the corresponding optimisation routine at step 2201. At step 2202, a question is asked as to whether the limit is either the low-pressure shaft speed, $N_L$ (either mechanical or aerodynamic), or the high-pressure shaft speed, $N_H$ (either mechanical or aerodynamic).

If the trigger was low-pressure shaft speed, $N_L$, then control proceeds to step 2203 in which the optimiser 302 maximises the power generation by the LP motor-generator 119, $P_L$ to decrease the low-pressure shaft speed. As described previously with respect to other optimisation routines, the electrical energy generated may be stored if capacity is available in an energy storage system such as battery 305, or alternatively it may be diverted to other systems such as anti-icing systems or potentially the HP motor-generator 117.

If the trigger was high-pressure shaft speed, $N_H$, then control instead proceeds to step 2204 in which the optimiser 302 maximises the power generation by the HP motor-generator 117, $P_H$ to decrease the high-pressure shaft speed. Again, the power generated thereby may be diverted to storage or to loads.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A gas turbine engine for an aircraft, comprising:
a high-pressure (HP) spool comprising an HP compressor and a first electric machine driven by an HP turbine, the first electric machine having a first maximum output power;
a low-pressure (LP) spool comprising an LP compressor and a second electric machine driven by an LP turbine, the second electric machine having a second maximum output power; and
an engine controller configured to identify a condition to the effect that the LP turbine is operating in an unchoked regime, and, in response to an electrical power demand being between zero and the first maximum output power, only extracting electrical power from the first electric machine to meet the electrical power demand.

2. The gas turbine engine of claim 1, in which the operation of the LP turbine in the unchoked regime is identified on the basis of an engine inlet flow Mach number being below a threshold and a thrust demand being below a threshold.

3. A method of reducing fuel consumption at low inlet Mach numbers in a gas turbine engine of the type having a high-pressure (HP) spool comprising an HP compressor and a first electric machine driven by an HP turbine, the first electric machine having a first maximum output power, and a low-pressure (LP) spool comprising an LP compressor and a second electric machine driven by an LP turbine, the second electric machine having a second maximum output power, the method comprising:

identifying a condition to the effect that the LP turbine is operating in an unchoked regime; and in response to an electrical power demand being between zero and the first maximum output power, only extracting electrical power from the first electric machine to meet the electrical power demand.

4. The method of claim 3, in which the unchoked regime is identified on the basis of an engine inlet flow Mach number being below a threshold and a thrust demand being below a threshold.

* * * * *